US012148606B2

(12) United States Patent
Evans-Nguyen et al.

(10) Patent No.: US 12,148,606 B2
(45) Date of Patent: Nov. 19, 2024

(54) METHODS FOR SAMPLING INTO AN ATMOSPHERIC PRESSURE INLET MASS SPECTROMETER

(71) Applicant: University of South Florida, Tampa, FL (US)

(72) Inventors: Theresa Evans-Nguyen, Brandon, FL (US); Linxia Song, Temple Terrace, FL (US); Yi You, Shandong (CN)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 17/768,089

(22) PCT Filed: Oct. 13, 2020

(86) PCT No.: PCT/US2020/055312

§ 371 (c)(1),
(2) Date: Apr. 11, 2022

(87) PCT Pub. No.: WO2021/076464

PCT Pub. Date: Apr. 22, 2021

(65) Prior Publication Data

US 2024/0096610 A1 Mar. 21, 2024

Related U.S. Application Data

(60) Provisional application No. 62/915,349, filed on Oct. 15, 2019.

(51) Int. Cl.

*H01J 49/00* (2006.01)
*H01J 49/04* (2006.01)
*H01J 49/24* (2006.01)

(52) U.S. Cl.

CPC ...... *H01J 49/0095* (2013.01); *H01J 49/0454* (2013.01); *H01J 49/24* (2013.01)

(58) Field of Classification Search

CPC ... H01J 49/0095; H01J 49/00454; H01J 49/24
USPC ................................ 250/281, 282, 283, 288
See application file for complete search history.

(56) References Cited

U.S. PATENT DOCUMENTS

2012/0145890 A1* 6/2012 Goodlett ............ H01J 49/0454 250/288
2017/0176401 A1 6/2017 Bajic et al.
2017/0178884 A1 6/2017 Murtazin

OTHER PUBLICATIONS

International Search Report and Written Opinion in International Application No. PCT/US20/55312, dated Jan. 21, 2021, 9 pages.

(Continued)

*Primary Examiner* — Nicole M Ippolito

(74) *Attorney, Agent, or Firm* — Nicholas Pfeifer; Smith & Hopen, P.A.

(57) ABSTRACT

Provided herein are systems and methods for sampling analytes into an atmospheric pressure inlet mass spectrometer using ultrasonic nebulization-assisted atmospheric pressure chemical ionization. The systems can include a mass spectrometer having an input and an ultrasonic nebulizer chip. The ultrasonic nebulizer chip can be operatively coupled to the mass spectrometer, such that when the ultrasonic nebulizer chip nebulizes the analyte to provide a nebulized analyte, at least some of the nebulized analyte enters the input of the mass spectrometer.

20 Claims, 24 Drawing Sheets

(56) References Cited

OTHER PUBLICATIONS

Song et al., "Ultrasonic-Nebulizer-Assisted Atmospheric-Pressure Chemical Ionization Mass Spectrometry," University of South Florida, Jun. 2-6, 2019, 1 page.

International Preliminary Report on Patentability in International Application No. PCT/US2020/055312, dated Apr. 28, 2022, 7 pages.

* cited by examiner a)

Chemical Formula: $C_{56}H_{95}N_9O_6$
Exact Mass: 989.7 b)

Chemical Formula: $C_{35}H_{62}N_6O_4$
Exact Mass: 630.5

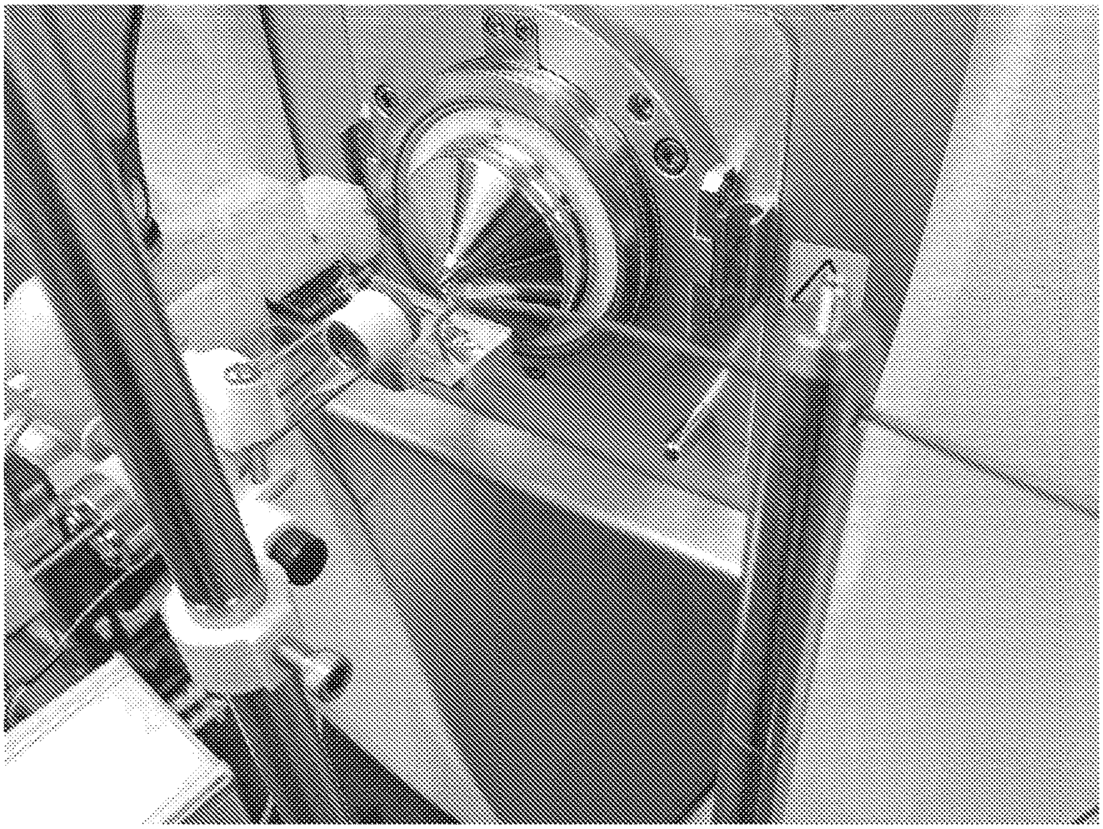
FIG. 12
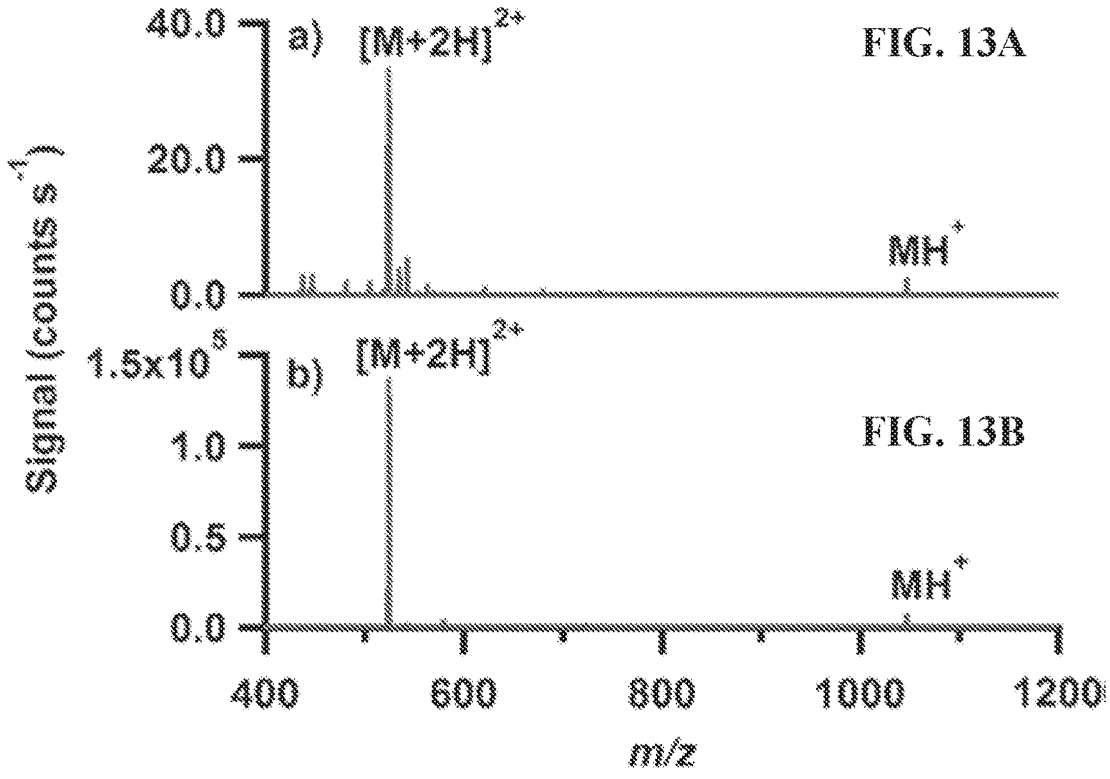
FIG. 13A
FIG. 13B

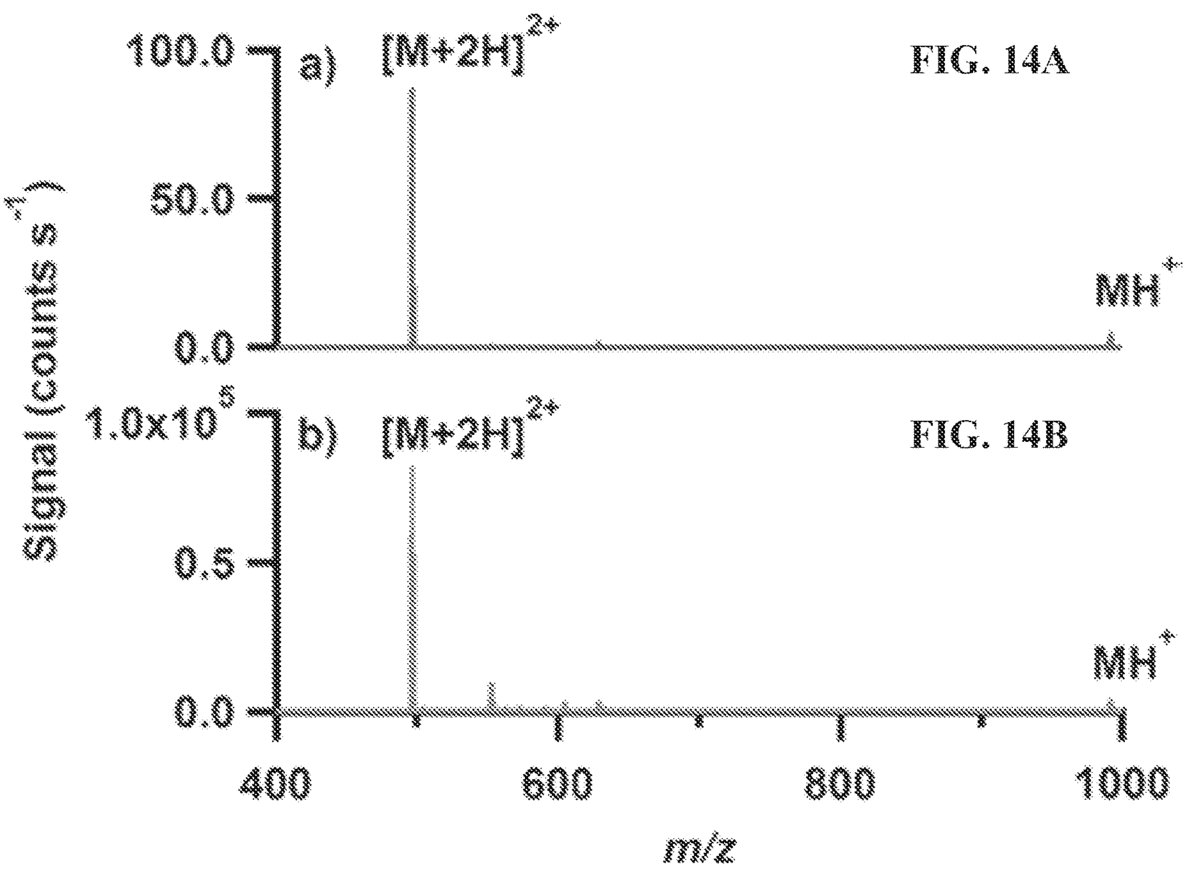
FIG. 14A
FIG. 14B
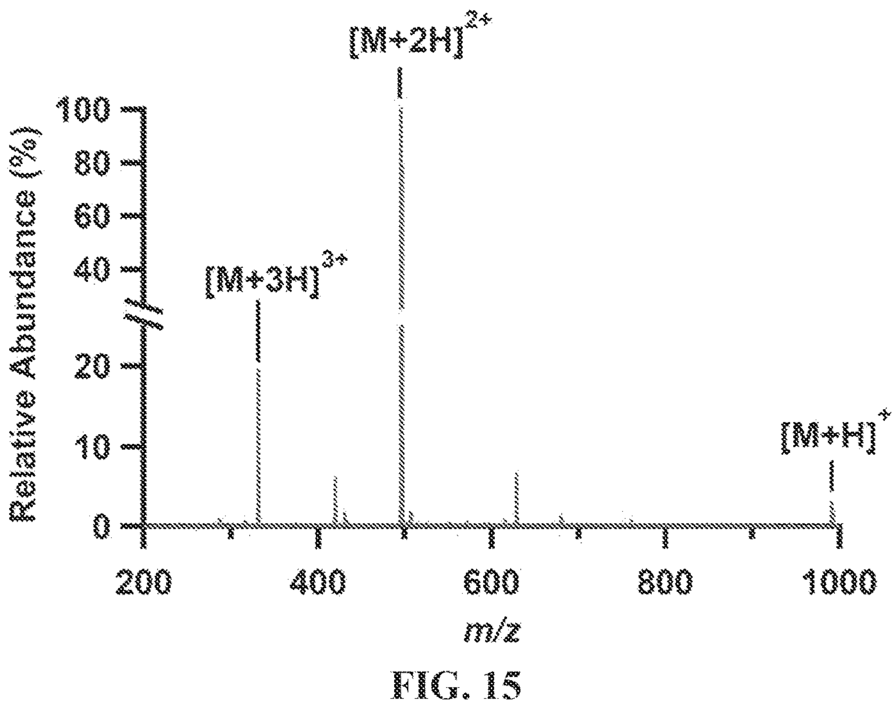
FIG. 15

METHODS FOR SAMPLING INTO AN ATMOSPHERIC PRESSURE INLET MASS SPECTROMETER

CROSS-REFERENCE TO RELATED APPLICATIONS

This application is a U.S. National Phase Application of International Application No. PCT/US2020/055312, filed on Oct. 13, 2020, which claims priority to U.S. Provisional Application No. 62/915,349, filed on Oct. 15, 2019, both of which are incorporated by reference in their entirety.

TECHNICAL FIELD

This disclosure relates to the sampling of a gaseous analyte into an atmospheric pressure inlet mass spectrometer using ultrasonic nebulization-assisted atmospheric pressure chemical ionization.

BACKGROUND

Mass Spectrometry-based instrumentation embodies a sensitive and definitive means to chemical analysis providing general identification and quantitation for various analytes. For some sample compositions, MS-oriented sample preparation can be greatly simplified by incorporating new ambient desorption/ionization mass spectrometry (ADI-MS) techniques. ADI-MS sources such as desorption electrospray ionization (DESI) and direct analysis in real time (DART) integrate direct exposure of the sample with the ionization process for their immediate sampling into mass spectrometers with atmospheric pressure inlets. For example, complex biological samples can be supplied as discrete droplets or even as dried fluid spots on surfaces which are directly exposed to the ADI-MS probe. Fundamentally, individual analytes of interest must be both transformed into the gas phase and ionized almost simultaneously from their native environments to become detectable by the MS. Effective, efficient, and quick sample introduction, especially for complicated sample matrices such as biological samples depends heavily on the nature of the sample including the analyte and the surrounding matrix.

Methods employing spray-based techniques, such as DESI, can ionize molecules across a wide range of mass-to-charge ratios, but are commonly used for moderately to highly polar analytes. Alternatively, methods employing electrical plasmas, such as DART, are capable of ionizing polar and nonpolar analytes but primarily for those with low molecular masses. As such, developments of universal ionization methods, which do not depend on the polarity or the molecular weight of the analyte remain challenging and are continually sought.

One approach for sample introduction is through nebulization to transform analytes into the gas phase. The production of fine and ultrafine droplets during nebulization often generates a small fraction of particles that carry charges. This effect allowed surface acoustic wave nebulization (SAWN) to serve as a standalone ionization source for MS, however, charging is not highly favored during nebulization. For instance, SAWN and the related method of sonic spray ionization often result in low ionization efficiencies that are several orders of magnitude lower than that of the gold standard atmospheric pressure source of electrospray ionization. Therefore, when a relatively large quantity of ions is needed (e.g., tandem MS or $MS^n$), nebulization-based ionization methods may not be suitable. Thus, modifications and combinations of ultrasound-based nebulization methods with orthogonal ionization approaches were often used to improve the ionization efficiency. Meanwhile, combining external ionization methods without deep modification of ultrasound-based nebulizer was also reported as a simple alternative, such as extractive electrospray ionization (EESI), and atmospheric pressure chemical ionization (APCI). Previous investigations suggested that APCI is capable of interacting with the fine droplets produced by a SAWN. This combination produces intact molecular ions with sufficient charging to demonstrate the potential applicability of SAWN-APCI towards real-life applications. Unfortunately, the complexity of SAWN and its high cost limited its potential users from accessing such devices.

SUMMARY

The present application describes a mass spectrometry ionization source comprising an ultrasonic piezo, termed ultrasonic nebulizer, which is coupled with an APCI source. In some embodiments, the ultrasonic piezo is from an indoor humidifier. Used together, these components preserve intact molecular analytes across a range of analyte classes imparting a "softness" to the ionization method similar to electrospray ionization but applicable to both polar and non-polar analytes. The "softness" of the method indicates the low level of energy deposition which may be characterized by a quantity termed survival yield (SY) of representative thermometer ions. The survival yield is used to calibrate the internal energy distribution of ions after collision activation. In some embodiments, compounds with a simple and well-understood dissociation pattern are used to probe the energy uptake due to the activation process.

Some embodiments provide an analytical system for analyzing an analyte, the analytical system comprising: a mass spectrometer having an input; and an ultrasonic nebulizer chip operatively coupled to the mass spectrometer, such that when the ultrasonic nebulizer chip nebulizes the analyte to provide a nebulized analyte, at least some of the nebulized analyte enters the input of the mass spectrometer.

Some embodiments provide a method for analyzing an analyte, the method comprising: nebulizing a suspension of the analyte in a solvent with an ultrasonic nebulizer chip to provide a nebulized suspension wherein the ultrasonic nebulizer chip is operatively coupled to a mass spectrometer having an input; and performing mass spectrometry on the nebulized suspension.

DESCRIPTION OF DRAWINGS

FIG. 5A shows the signal response of caffeine (m/z 195.1) to APCI activation (extracted ion chromatogram). SAWN was continuously applied, while APCI was manually switched on and off. FIG. 5B shows the time-averaged mass spectrum of caffeine with APCI "off. " FIG. 5C shows the time-averaged mass spectrum of caffeine with APCI on.

FIG. 11A shows a SAWN-APCI mass spectrum of Peptide-2, and FIG. 11B is the zoomed view in the m/z range of 290 to 370. The positive axis is the recorded mass spectrum with SAWN-APCI for Peptide-2, and the simulated triply charged Peptide-2 is shown on the negative axis.

FIG. 12 is an image of concealed APCI-SAWN setup.

FIGS. 13A-13B show the mass spectra of angiotensin II with APCI off (FIG. 13A) and APCI on (FIG. 13B) with 10.011 g/mL solution.

FIGS. 14A-14B show the mass spectra of Peptide-2 $C_{55}H_{95}N_9O_6$ (monoisotopic mass=989.7 g mol-1) with APCI off (FIG. 14A) and on (FIG. 14B).

FIG. 15 shows the Peptide-2 mass spectra obtained with an ESI source.

DETAILED DESCRIPTION

Figure 1:
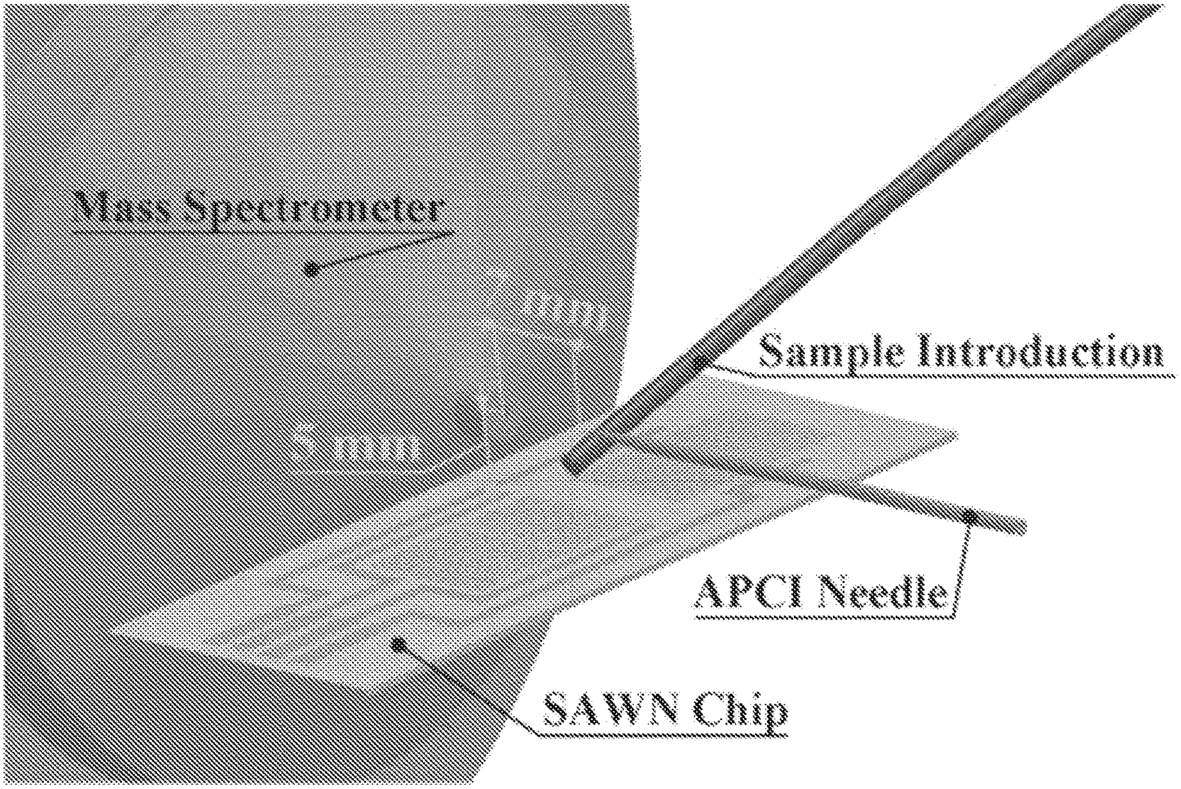
FIG. 1 shows a schematic of ultrasonic nebulizer-APCI coupling. The ultrasonic nebulizer piezoelectric was placed below the inlet capillary. The distance between the APCI needle and MS capillary inlet was 7 mm.

Where values are described as ranges, it will be understood that such disclosure includes the disclosure of all possible sub-ranges within such ranges, as well as specific numerical values that fall within such ranges irrespective of whether a specific numerical value or specific sub-range is expressly stated.

As used herein, the term "survival yield" (SY) is a value that is calculated using formula (1):

$$SY = \frac{S_{parent}}{S_{parent} + \sum S_{fragment}} \times 100\% \tag{1}$$

where $S_{parent}$ and $S_{fragment}$ are the relative intensity of signals for (1) the parent molecular ion and (2) summation of all fragment ions, respectively in a mass spectrum. The summation symbol refers to the total ion signal contributed from all possible fragments. The higher the survival yield, the higher the softness of the mass spectroscopic method used to obtain the mass spectrum.

Some embodiments provide an analytical system for analyzing an analyte, the analytical system comprising: a mass spectrometer having an input; and an ultrasonic nebulizer chip operatively coupled to the mass spectrometer, such that when the ultrasonic nebulizer chip nebulizes the analyte to provide a nebulized analyte, at least some of the nebulized analyte enters the input of the mass spectrometer.

In some embodiments, the ultrasonic nebulizer chip further comprises a continuous-mode driver. In some embodiments, the ultrasonic nebulizer chip is operatively coupled with an atmospheric pressure chemical ionization device. In some embodiments, the atmospheric pressure chemical ionization device comprises a corona discharge needle. In some embodiments, the distance between the input and the corona discharge needle is about 3 mm to about 11 mm (e.g., about 4 mm to about 10 mm, about 5 mm to about 9 mm, about 6 mm to about 8 mm, or about 7 mm). In some embodiments, the corona discharge needle is powered by a power supply. In some embodiments, a resistor is connected to the power supply and to the needle. In some embodiments, the resistor is a 6 kΩ current limiting resistor. In some embodiments, a toroid inductor is connected to the resistor and to the needle. In some embodiments, the toroid inductor has an operating frequency of between about 50 pH to about 70 pH (e.g., about 60 pH).

In some embodiments, the operating frequency of the ultrasonic nebulizer chip is between about 1.5 MHz and about 3.5 MHz (e.g., about 2.5 MHz).

In some embodiments, the ultrasonic nebulizer chip is activated for about 1 to about 10 seconds to nebulize the analyte to provide a nebulized analyte. For example, the ultrasonic nebulizer chip is activated for about 2 to about 6 seconds, about 3 to about 5 seconds, or 4 seconds. In some embodiments, the ultrasonic nebulizer chip is activated for about 4 seconds.

In some embodiments, the atmospheric pressure chemical ionization device is activated while the ultrasonic nebulizer chip nebulizes the analyte to produce a nebulized analyte.

In some embodiments, the analytical system is run in pulsed-mode operation.

In some embodiments, the ultrasonic nebulizer chip operatively coupled with the atmospheric pressure chemical ionization device has an ionization efficiency that is greater than an ionization efficiency produced by the atmospheric pressure chemical ionization device alone.

In some embodiments, the ultrasonic nebulizer chip operatively coupled with the atmospheric pressure chemical ionization device has a first ionization efficiency that is greater than a third ionization efficiency produced by a surface acoustic wave nebulization device alone.

In some embodiments, the ultrasonic nebulizer chip comprises an ultrasonic piezoelectric transducer.

In some embodiments, the atmospheric pressure chemical ionization device ionizes the analyte to provide an ionized analyte, wherein at least some of the ionized analyte enters the input of the mass spectrometer. In some embodiments, the system further comprises an electronic data acquisition system in electronic communication with the mass spectrometer, wherein the electronic data acquisition system processes a plurality of signals provided by the mass spectrometer, wherein the electronic data acquisition system comprises at least one analog-to-digital converter producing digitized data from the plurality of signals provided by the mass spectrometer.

In some embodiments, the electronic data acquisition system is activated while the ultrasonic nebulizer chip nebulizes the analyte to produce a nebulized analyte. In some embodiments, the at least one analog-to-digital converter produces the digitized data from the plurality of signals in a time interval of about 1 second to about 10 seconds, for example, 1 second, 2 seconds, 3 seconds, 4 seconds, 5 seconds, 6 seconds, 7 seconds, 8 seconds, 9 seconds, 10 seconds, or any value in between. In some embodiments, the at least one analog-to-digital converter produces the digitized data from the plurality of signals in a time interval of about 5 seconds.

In some embodiments, the plurality of signals comprise a mass spectrum of the analyte. In some embodiments, the analyte is a polar analyte, a non-polar analyte, a lipid, a biomolecule, or any combination thereof.

In some embodiments, the analyte is a molecule having a molecular weight of about 50 daltons to about 1500 daltons, or any value in between. In other embodiments, the analyte is a molecule having a molecular weight of about 500 daltons to about 2500 daltons, or any value in between. In still other embodiments, the analyte is a molecule having a molecular weight of about 2000 daltons to about 5000 daltons, or any value in between. In some embodiments, the analyte is a molecule having a molecular weight of about 3000 daltons to about 10000 daltons, or any value in between.

In some embodiments, the analyte is a liquid analyte that contacts a surface of the ultrasonic nebulizer chip.

In some embodiments, the survival yield of the ultrasonic nebulizer chip operatively coupled with the atmospheric pressure chemical ionization device is greater than the survival yield of a surface acoustic wave nebulization device alone. In some embodiments, the survival yield of the ultrasonic nebulizer chip operatively coupled with the atmospheric pressure chemical ionization device is between about 0.5% to about 50% greater than the survival yield of a surface acoustic wave nebulization device alone (e.g., about 0.5% to about 2%, about 2% to about 8%, about 8% to about 15%, about 15% to about 25%, about 25% to about 35%, about 35% to about 50%, about 0.5%, about 0.7%, about 1%, about 1.5%, about 2%, about 2.5%, about 3%, about 4%, about 5%, about 7%, about 10%, about 15%, about 20%, about 25%, about 30%, about 35%, about 40%, about 45%, or about 50%). In some embodiments, the survival yield of the ultrasonic nebulizer chip operatively coupled with the atmospheric pressure chemical ionization device is greater than the survival yield of an electrospray ionization device alone. In some embodiments, the survival yield of the ultrasonic nebulizer chip operatively coupled with the atmospheric pressure chemical ionization device is between about 0.5% to about 50% greater than the survival yield of an electrospray ionization device alone (e.g., about 0.5% to about 2%, about 2% to about 8%, about 8% to about 15%, about 15% to about 25%, about 25% to about 35%, about 35% to about 50%, about 0.5%, about 0.7%, about 1%, about 1.5%, about 2%, about 2.5%, about 3%, about 4%, about 5%, about 7%, about 10%, about 15%, about 20%, about 25%, about 30%, about 35%, about 40%, about 45%, or about 50%).

In some embodiments, the relative intensity of the $[M+H]^+$ peak in a mass spectrum produced by the ultrasonic nebulizer chip operatively coupled with the atmospheric pressure chemical ionization device is 100%. In some embodiments, the ratio of the $[M+H]^+$ peak to the peak having the second highest relative intensity in a mass spectrum produced by the ultrasonic nebulizer chip operatively coupled with the atmospheric pressure chemical ionization device is greater (e.g., about 5% to about 1000% greater, about 5% to about 30% greater, about 30% to about 60% greater, about 60% to about 100% greater, about 100% to about 150% greater, about 150% to about 200% greater, about 200% to about 300% greater, about 300% to about 400% greater, about 400% to about 600% greater, about 600% to about 800% greater, about 800% to about 1000% greater, or greater than about 1000% greater) than the ratio of the [M+H]+ peak to the peak having the second highest relative intensity produced by a surface acoustic wave nebulization chip operatively coupled with an atmospheric pressure chemical ionization device.

Some embodiments provide a method for analyzing an analyte, the method comprising: nebulizing a suspension of the analyte in a solvent with an ultrasonic nebulizer chip to provide a nebulized suspension wherein the ultrasonic nebulizer chip is operatively coupled to a mass spectrometer having an input; and performing mass spectrometry on the nebulized suspension.

Some embodiments further comprise contacting the analyte with a surface of the ultrasonic nebulizer chip and introducing the analyte into the input of the mass spectrometer; wherein the analyte is a liquid analyte.

Some embodiments further comprise delivering the liquid analyte to the surface of the ultrasonic nebulizer chip at a flow rate of about 1 to about 20 microliters per minute (μL/min).

Some embodiments further comprise delivering the liquid analyte to the surface of the ultrasonic nebulizer chip at a flow rate of about 5 to about 50 microliters per minute (μL/min), or any value in between. Other embodiments further comprise delivering the liquid analyte to the surface of the ultrasonic nebulizer chip at a flow rate of about 5 to about 15 microliters per minute (μL/min), or any value in between. In some embodiments, the flow rate is about 8 microliters per minute (μL/min).

Some embodiments further comprise using a continuous-mode driver of the ultrasonic nebulizer chip while nebulizing the suspension of the analyte.

In some embodiments, the ultrasonic nebulizer chip is operatively coupled with an atmospheric pressure chemical ionization device. In some embodiments, the atmospheric pressure chemical ionization device comprises a corona discharge needle. In some embodiments, the distance between the input and the corona discharge needle is about 3 mm to about 11 mm (e.g., about 4 mm to about 10 mm, about 5 mm to about 9 mm, about 6 mm to about 8 mm, or about 7 mm). In some embodiments, the corona discharge needle is powered by a power supply. In some embodiments, a resistor is connected to the power supply and to the needle. In some embodiments, the resistor is about a 6 kΩ current limiting resistor. In some embodiments, a toroid inductor is connected to the resistor and to the needle. In some embodiments, the toroid inductor has an operating frequency of between about 50 μH to about 70 μH (e.g., about 60 μH).

In some embodiments, the operating frequency of the ultrasonic nebulizer chip is between about 1.5 MHz and about 3.5 MHz (e.g., about 2.5 MHz).

In some embodiments, the ultrasonic nebulizer chip is activated for about 1 to about 10 seconds to nebulize the analyte to provide a nebulized analyte. For example, the ultrasonic nebulizer chip is activated for about 2 to about 6 seconds, about 3 to about 5 seconds, or 4 seconds. In some embodiments, the ultrasonic nebulizer chip is activated for about 4 seconds.

In some embodiments, the atmospheric pressure chemical ionization device is activated while the ultrasonic nebulizer chip nebulizes the analyte to produce a nebulized analyte.

In some embodiments, the ultrasonic nebulizer chip operatively coupled with the atmospheric pressure chemical ionization device has an ionization efficiency that is greater than an ionization efficiency produced by the atmospheric pressure chemical ionization device alone.

In some embodiments, the ultrasonic nebulizer chip operatively coupled with the atmospheric pressure chemical ionization device has a first ionization efficiency that is greater than a third ionization efficiency produced by a surface acoustic wave nebulization device alone.

In some embodiments, the atmospheric pressure chemical ionization device ionizes the analyte to provide an ionized analyte, wherein at least some of the ionized analyte enters the input of the mass spectrometer.

In some embodiments, the analyte is a polar analyte, a non-polar analyte, a lipid, a biomolecule, or any combination thereof.

In some embodiments, the analyte is a molecule having a molecular weight of about 50 daltons to about 1500 daltons, or any value in between. In other embodiments, the analyte is a molecule having a molecular weight of about 500 daltons to about 2500 daltons, or any value in between. In still other embodiments, the analyte is a molecule having a molecular weight of about 2000 daltons to about 5000 daltons, or any value in between. In some embodiments, the analyte is a molecule having a molecular weight of about 3000 daltons to about 10000 daltons, or any value in between.

In some embodiments, the survival yield of the ultrasonic nebulizer chip operatively coupled with the atmospheric pressure chemical ionization device is greater than the survival yield of a surface acoustic wave nebulization device alone. In some embodiments, the survival yield of the ultrasonic nebulizer chip operatively coupled with the atmospheric pressure chemical ionization device is between about 0.5% to about 50% greater than the survival yield of a surface acoustic wave nebulization device alone (e.g., about 0.5% to about 2%, about 2% to about 8%, about 8% to about 15%, about 15% to about 25%, about 25% to about 35%, about 35% to about 50%, about 0.5%, about 0.7%, about 1%, about 1.5%, about 2%, about 2.5%, about 3%, about 4%, about 5%, about 7%, about 10%, about 15%, about 20%, about 25%, about 30%, about 35%, about 40%, about 45%, or about 50%). In some embodiments, the survival yield of the ultrasonic nebulizer chip operatively coupled with the atmospheric pressure chemical ionization device is greater than the survival yield of an electrospray ionization device alone. In some embodiments, the survival yield of the ultrasonic nebulizer chip operatively coupled with the atmospheric pressure chemical ionization device is between about 0.5% to about 50% greater than the survival yield of an electrospray ionization device alone (e.g., about 0.5% to about 2%, about 2% to about 8%, about 8% to about 15%, about 15% to about 25%, about 25% to about 35%, about 35% to about 50%, about 0.5%, about 0.7%, about 1%, about 1.5%, about 2%, about 2.5%, about 3%, about 4%, about 5%, about 7%, about 10%, about 15%, about 20%, about 25%, about 30%, about 35%, about 40%, about 45%, or about 50%).

In some embodiments, the relative intensity of the $[M+H]^+$ peak in a mass spectrum produced by the ultrasonic nebulizer chip operatively coupled with the atmospheric pressure chemical ionization device is 100%. In some embodiments, the ratio of the $[M+H]^+$ peak to the peak having the second highest relative intensity in a mass spectrum produced by the ultrasonic nebulizer chip operatively coupled with the atmospheric pressure chemical ionization device is greater (e.g., about 5% to about 1000% greater, about 5% to about 30% greater, about 30% to about 60% greater, about 60% to about 100% greater, about 100% to about 150% greater, about 150% to about 200% greater, about 200% to about 300% greater, about 300% to about 400% greater, about 400% to about 600% greater, about 600% to about 800% greater, about 800% to about 1000% greater, or greater than about 1000% greater) than the ratio of the [M+H]+ peak to the peak having the second highest relative intensity produced by a surface acoustic wave nebulization chip operatively coupled with an atmospheric pressure chemical ionization device.

EXAMPLES

The invention is further described in the following examples, which do not limit the scope of the invention described in the claims.

General

Optima LC/MS grade solvents, including methanol (L454-4), water (W7-4), acetonitrile (A-955-4), formic acid (A117-50) and acetic acid (A113-50) were purchased from Fisher Scientific (Fair Lawn, NJ). Sodium ampicillin was obtained from GoldBio (St. Louis, MO). Ciprofloxacin was purchased from Fisher Scientific (Fair Lawn, NJ). Milk sample was bought in local super markets. Milk sample was spiked with 1000 μg/mL antibiotic drugs and used as stock solution. Then milk samples were used directly or with minimal sample preparation. Amicon Ultra centrifugal filters was used for sample clean up.

Ionization Source

The SAWN power supply (SAWN controller V2.0) and SAWN standing wave chips V2.0 were purchased from Deurion LLC (Seattle, WA). The fabrication and operation of SAWN chips have been reported in previous publications. The SAWN used in this study operates at 9.56 MHz. Liquid sample was introduced onto the surface of the SAWN chip continuously via LTQ syringe pump at a flow rate of 8 uL/min through a peek tubing (length 70 cm, inner diameter=50 μm). The exit of the peak tubing was placed above the geometric center of SAWN chip surface.

The ultrasonic piezo transducer was obtained by dissembling a commercial humidifier (unbranded, China). A continuous-mode driver was built in-house. The typical total power used in this work was ~10 W at 2.5 MHz. Liquid samples droplets were directly introduced onto the surface of piezoelectric device in single-shot mode with microliter pipettes (Transferpette, 10A8402). Notably, the sample can be supplied onto the piezoelectric surface with syringe pump at a flow rate of 8 μL/min when continuous mode operation is desired.

For ionization, an APCI needle from Thermo Fisher (Fair Lawn, NJ) was used to establish and sustain a corona discharge. The voltage and current of the needle was controlled and monitored with a high-voltage power supply (PS350, Stanford Research System, Sunnyvale, CA) at +3 kV and 3 μA, respectively. To obtain a stable corona discharge a 6 kΩ current limiting resistor was connected between the power supply and the needle. Moreover, a toroid inductor of ~60 μH was connected in series with the resistor and needle to avoid arcing during the presence of large amounts of airborne droplet while nebulizing. FIG. 1 shows a schematic of ultrasonic nebulizer-APCI coupling. The ultrasonic nebulizer piezoelectric was placed below the inlet capillary. The distance between the APCI needle and MS capillary inlet was 7 mm.

Mass Spectrometer

All mass spectra were recorded with in positive ion mode. In this study, two mass spectrometers were used: a linear ion trap (LTQ XL, Thermo Scientific, San Jose, CA) and a linear ion trap Orbitrap (LTQ Orbitrap XL, Thermo Scientific, Bremen, Germany). To maintain comparable experimental conditions, the instrument configurations of both mass spectrometers were similarly set. The temperature of the ion-transfer tube was maintained at 200° C., unless otherwise specified. The capillary voltage was maintained at 100V. The ion-injection time and acquisition parameters were set at 200 ms and 3 microscans, respectively. The mass ranges on the linear ion trap were set to m/z 75-400 and m/z 250-400 for thermometer ions and, ampicillin and ciproflocaxin, respectively. During milk analyses the mass range on the mass spectrometer was set to m/z 200 to 750.

Example 1: Synthesis of Benzylpyridium Salts

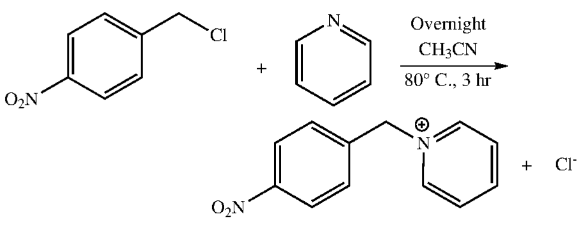

All reagents and solvents used were obtained from Sigma-Aldrich Co (St. Louis, MO, USA). 4-nitrobenzylchloride (1.0 equiv.) and pyridine (1.2 equiv.) were refluxed in anhydrous acetonitrile. The solution was brought to room temperature and stirred for 12 h. On completion, $Et_2O$ was added to the mixture; formation of a precipitate was observed. The mixture was concentrated in vacuo at 35° C. to afford the title compound. $^1H$ NMR (DMSO, 400 MHz): δ 7.74 (dd, J=7.7, 1.8 Hz, 1H), 7.52-7.39 (m, 2H), 7.14 (dd, J=8.2, 1.8 Hz, 1H), 7.01 (t, J=7.5 Hz, 1H), 6.98-6.87 (m, 2H).

The test solution of 4-nitro-BzPy was prepared by dissolving in a water methanol mixture (1:1 v/v) at 4 mg/L.

Example 2: Direct Source Comparison

The dissociation of 4-nitro-BzPy was extensively used to gauge the "softness" (or hardness) of an ionization method. During a mass-spectrometric analysis, the ion-signal ratio of the parent ion and fragments can be used as the benchmark. Quantitatively, the softness (or hardness) of the ionization process is assessed via survival yield (SY). The SY is calculated using formula (1):

$$SY = \frac{S_{parent}}{S_{parent} + \sum S_{fragment}} \times 100\% \quad (1)$$

where $S_{parent}$ and $S_{fragment}$ are the mass-spectral signals for the parent molecular ions and a fragment ion, respectively. The summation symbol refers to the total ion signal contributed from all possible fragments. In order to track all fragments in a mass spectrum, we recorded the tandem mass spectra of the thermometer ion. Throughout this study, the only fragment that can be observed from the thermometer ion resulted in X-79 peak rather the presence of other fragment ions. Thus, it is not possible to calculate base on the dissociation energy of the thermometer ion.

Here, we only compared the relative softness of different ionization methods, i.e., ultrasonic nebulizer, SAWN, ultrasonic nebulizer APCI, SAWN APCI, and ESI. Experimentally, the SY of ultrasonic nebulizer was found to be more resistive to the temperature change on the inlet capillary. In contrast, the SY of SAWN-APCI and ESI dropped below 90% at 375° C. and 315° C., respectively. If only the two ultrasound-based methods are compared, it is possible to relate them with their operating frequencies, and ultimately, the mean particle diameter.

The particle size distributions of the droplets produced during ultrasound-assisted nebulization is strongly tied to the oscillation frequency of the piezoelectric material. In the present disclosure, the operating frequency of the ultrasonic nebulizer was set at its resonance condition (2.5 MHz). Compared to SAWN, the aerosols generated by the ultrasonic nebulizer were theoretically calculated as ~2× larger in diameter before they entered the inlet capillary.

During the ion and charged droplet transportation inside the inlet capillary, the collision between them and the surface of the capillary can be assumed to 0; any changed species in contact with the inlet capillary should lose their charges and could not be detected by the ion detector. The remaining species inside the inlet capillary would then experience the radiative heat transfer. This process is directly proportional to the surface area of the droplet.

The energy distribution of the ions can be found if multiple fragments of known fragmentation energy exist. Because only a single fragment was observed here, a comparison of the SYs can provide information about only the relative softness of each source. At an inlet temperature of 225° C., NO2-BzPy (m/z 215.1) was the dominant peak with very little dissociation into NO2-benzyl (m/z 136.0). The average survival yield for the molecular ion was 97.6% for the ESI, 97.1% for SAWN and 99.1% for ultrasonic nebulizer. However, increasing the temperature to 300° C. results in a noticeable increase of the NO2-benzyl ion relative intensity, and the survival yield was reduced to 94.1% for ESI, 93.2% for SAWN and 98.9% for ultrasonic nebulizer. Upon increasing the capillary inlet temperature to 375° C., the relative abundance of the molecular ion was further reduced, and the survival yield dropped to 79.8% for ESI, 90.0% for SAWN and 96.9% for ultrasonic nebulizer. The data show that the temperature of the mass spectrometer inlet capillary used to aid desolvation during the ionization process regardless of the ionization method used.

Measurements of the series of eleven different capillary were taken. In this case, the extent of ion fragmentation was significantly less for the ultrasonic nebulizer compared with SAWN. The most likely cause of "softer" for ultrasonic nebulizer is the difference of particle size. In previous work, the particle size of SAWN was determined based on the SAW frequency (9.56 MHz) and solvent compositions. The frequency of ultrasonic nebulizer here is 2.5 MHz, which leads to the particle size larger based on the previous calculation equation. In this case, the particles of these sizes may contain more solvent compared to SAWN-generated particles. When a large size droplet carrying a large excess of ions of one particular charge, the charge density on its surface is continuously increased when solvent evaporates. This evaporation process need to absorb energy, which makes ultrasonic nebulizer "softer" compared to SAWN.

The internal energy of ions generated through spray ionization techniques originates in the thermal energy of the droplets from which they emerge, and in the conversion of collisions with the gas molecules in the atmospheric pressure interface. Earlier studied on the thermal energy distribution in ESI revealed that the characteristic temperature of ions at the time of formation, assumed to be the temperature of the droplet much higher than the temperature of ion source. Such high temperatures may be acquired through friction of the fast-moving droplets with gas molecule in the interface, which overcompensates for the effect of evaporative cooling. The droplet temperature increases with increasing the droplet velocity, surrounding gas pressure, and duration of the fractional process, but may also depend on the type of solvent and the size of droplets. The size of droplet affects its temperature through the evaporative cooling rate which is inversely proportional to the droplet radius and the heat dissipation efficiency, which decreases for smaller surface area to volume ratios.

Example 3: Direct Milk Analysis

Figure 2:
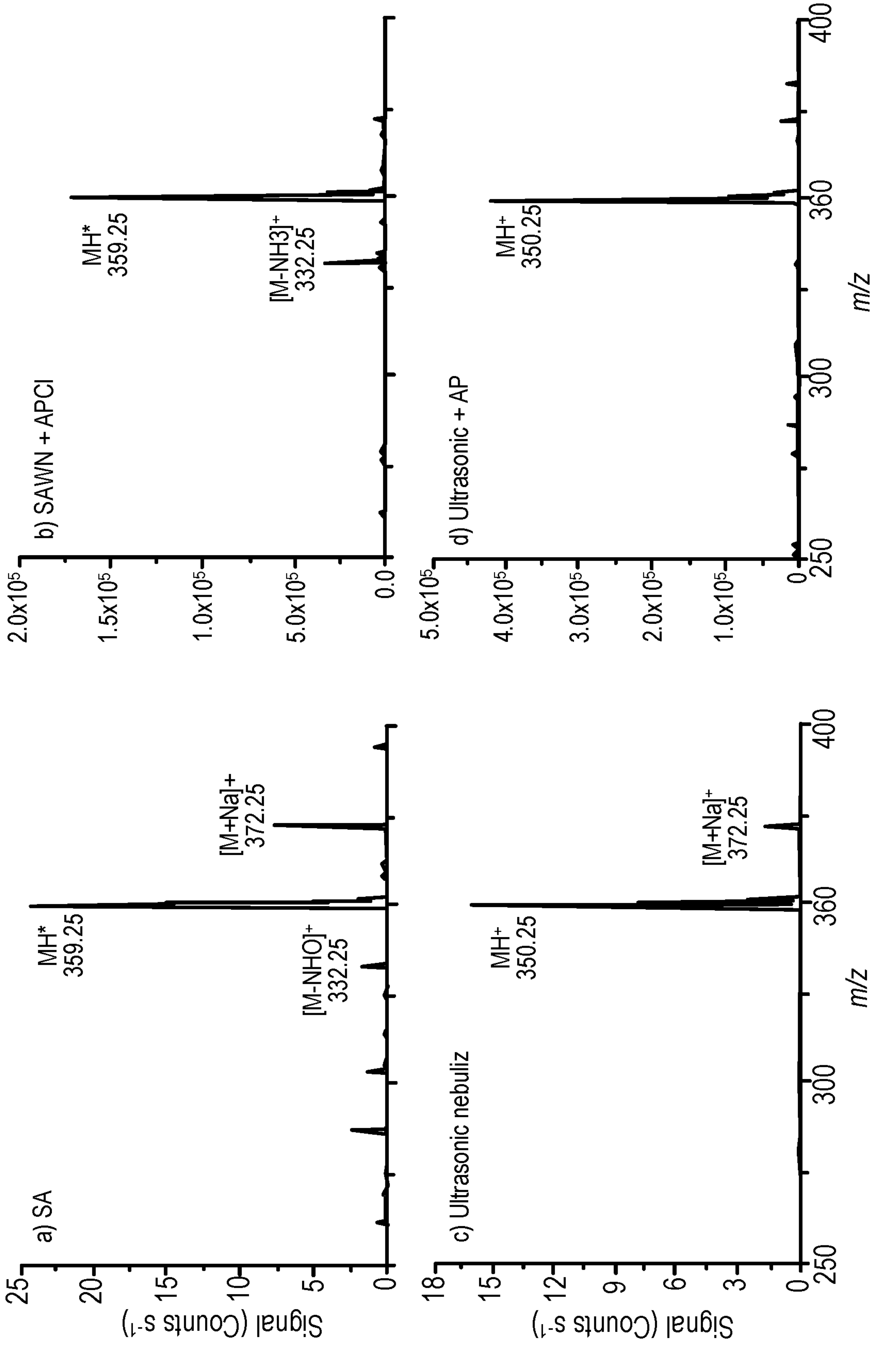
FIG. 2 shows the mass spectra of 10 ppm ampicillin, where Graphs (a), (b), (c), and (d) refer to SAWN, SAWN-APCI, ultrasonic nebulizer, and ultrasonic nebulizer-APCI, respectively.

Two antibiotic drugs (ampicillin and ciprofloxacin) were tested separately and compared with SAWN-APCI. Ampicillin is administered to food producing animals both therapeutically and prophylactically. The PMO currently only requires bulk milk pickup tankers to be tested for the presence of at least four of six specific Beta-lactam drugs (10 ppb tolerance for ampicillin). The basic structure of penicillin (6-aminopenicillanic acid) consists of a thiozolidine ring fused to a β-lactam ring with a side chain. FIG. 2 shows the mass spectra of 10 ppm ampicillin, where Graphs (a), (b), (c), and (d) refer to SAWN, SAWN-APCI, ultrasonic nebulizer, and ultrasonic nebulizer-APCI, respectively. Upon closer inspection of the mass spectra, for SAWN and ultrasonic nebulizer alone, the base peak is the protonated molecular ion, and sodium adduct of ampicillin were also detected. In contrast, the mass spectra recorded with the SAWN-APCI and ultrasonic nebulizer-APCI was highly similar to that of ESI source. Specifically, no sodium adduct was detected with the conventional ESI source. And for SAWN-APCI and ultrasonic nebulizer-APCI, they have same order of magnitude enhancement. In addition, SAWN has more fragments compared with humidifier spectra, which agree with thermometer ions measurements.

Ciprofloxacin is a fluoroquinolone that is only approved for human use; it is not available in a formulation commonly given to cattle. Ciprofloxacin is also the marker residue for enrofloxacin, a fluoroquinolone approved for use in beef and non-lactating dairy cattle. Extra-label use of any fluoroquinolone (including ciprofloxacin and enrofloxacin) is prohibited in food-producing animals. The presence of ciprofloxacin, confirmed by drug residues in raw milk, suggest illegal extra-label use of a fluoroquinolone (enrofloxacin or ciprofloxacin). Ciprofloxacin was also tested by this method and compared to SAWN and SAWN-APCI. For SAWN and ultrasonic nebulizer alone, the base peak is the protonated molecular ion, and sodium adduct of ciprofloxacin was also detected.

Figure 3:
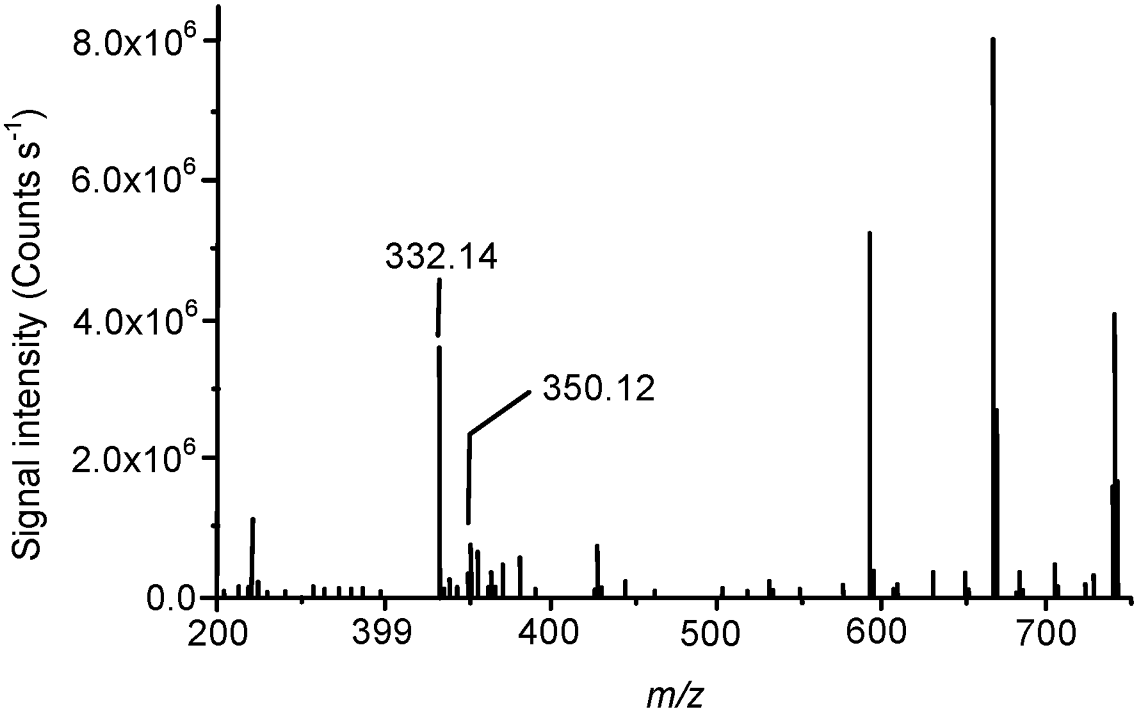
FIG. 3 shows the mass spectrum of milk spiked with 100 ppm drugs. The Orbitrap was used as the mass analyzer instead of the linear ion trap.

To access the rapid detection performance of the Ultrasonic nebulizer-APCI combination with complex samples, samples of unfiltered raw milk were spiked with two antibiotic drugs. FIG. 3 shows the mass spectrum of milk spiked with 100 ppm of each drug. The Orbitrap was used as the mass analyzer instead of the linear ion trap. The total sample volume in these measurements, consumed over a time interval of 5 s, was only about 0.54, each trial. Protonated ampicillin and Ciprofloxacin were observed. The remaining peaks were not identified.

Drug-spiked milk spiked was prepared at a variety of concentrations using pure milk and a drug stock solution. First, one 0.5 μL droplet of unspiked milk was deposited on the nebulizer surface by pipette tip as a control. No distinguishable signal at either m/z 332.2 or 350.3 was detected. Individual analyses from the four spiked milk samples were performed in series. The drug signal was monitored by following the m/z 332.2 signal in a single ion trace (SIC). The five measurements were completed in approximately 5 minutes, including sample deposit and cleaning of the transducer between samples. The response exhibited a linear relationship, with a linearity coefficient of R=0.9975, a limit of detection (LOD) of 4.0 ppb for ciprofloxacin; R=0.9997, a limit of detection of 5.6 ppb for ampicillin.

Example 4: Assessing Inlet-Temperature Dependency

In previous reports, the ion signal obtained through SAWN has been known to exhibit large variations over time compared to ESI. Before coupling with APCI, the operating parameters of the SAWN device were optimized including contact angles, distance to the inlet capillary, flow rate, solvent composition, and inlet-capillary temperature. Because we ultimately seek out both neutrals and charged droplets produced by the SAWN, the effects of ion signal depending on the temperature of the ion inlet-capillary in particular was carefully investigated.

Figure 4:
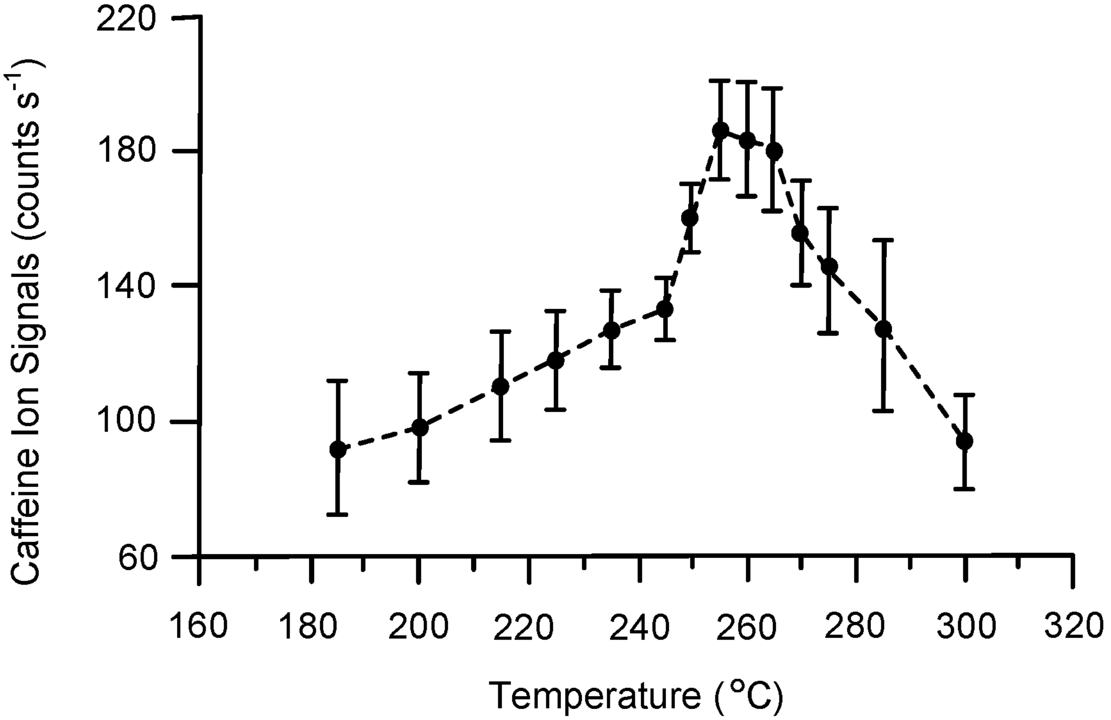
FIG. 4 is graph showing the temperature dependence of caffeine ion signal at m/z 195.1. Each point on this figure was extracted with an m/z range from 194.6 to 195.6. The signal variation was later assessed through the extracted ion chronogram corresponding to this range.

Specifically, a single droplet of caffeine solution (10 micrograms per milliliter) (μg/mL) was placed onto the SAWN chip for each individual temperature measurement. In this manner, the ion signal of caffeine with respect to the inlet-capillary temperature was recorded. FIG. 4 is graph showing the temperature dependence of caffeine ion signal at m/z 195.1. Each point on this figure was extracted with an m/z range from 194.6 to 195.6. The signal variation was later assessed through the extracted ion chronogram corresponding to this range. Between about 150 to 300° C., we determined an optimal inlet-capillary temperature at about 255° C., at which the maximal protonated ion signal for caffeine was found. Presumably, with increasing temperature up to about 250° C., passive heating facilitates particle desolvation. Charged droplets hence evaporate down to ions, even if they are not preformed in solution. Meanwhile, at temperatures above about 250° C., the ion signal decreases, which could be attributed to thermal decomposition and/or collision-induced charge losses.

Example 5: Enhancements in Ion Signals for Polar and Nonpolar Analytes

Figure 5A:
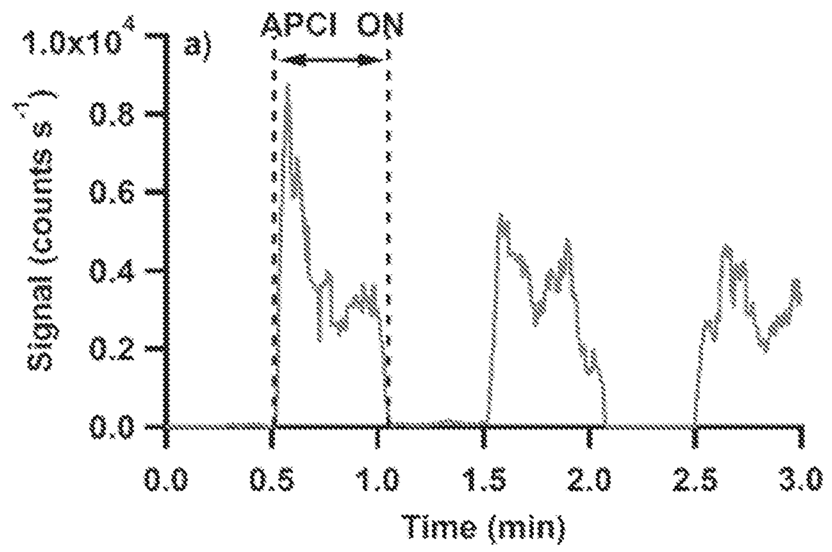
FIGS. 5A-5C are ion chronograms and time-averaged mass spectra of caffeine.
Figure 5B:
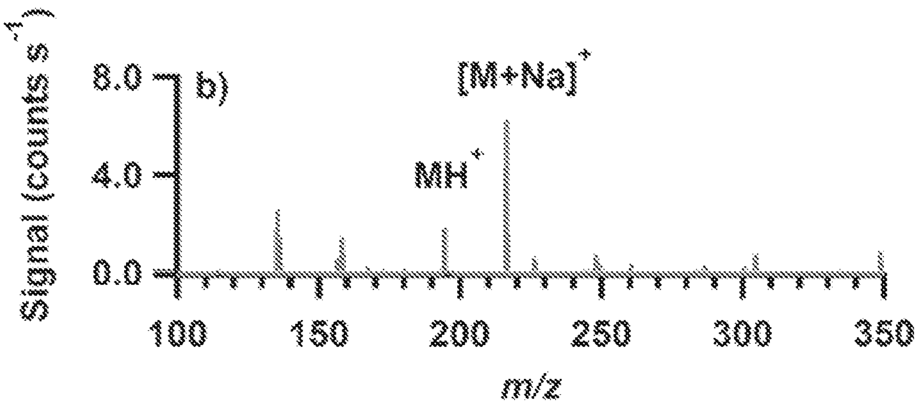
Figure 5C:
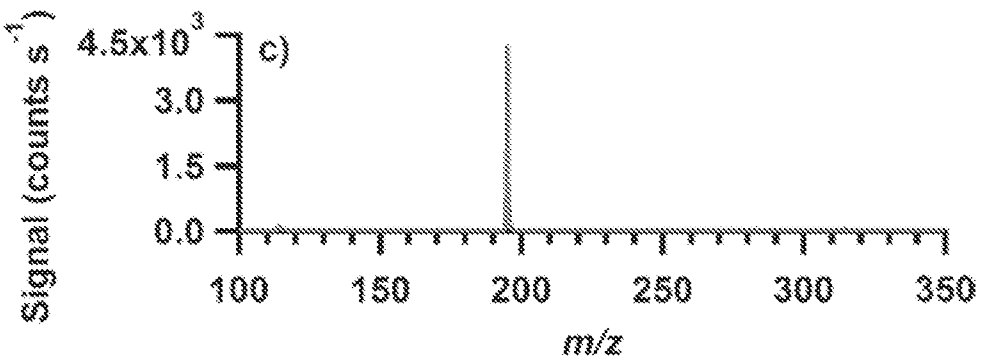

Comparisons between SAWN alone and SAWN-APCI were performed with a caffeine solution of 1 microgram per milliliter (μg/mL) with a continuous liquid feeding at a flow rate of 8 microliter per minute (μL/min). While manually engaging and disengaging the high voltage that was applied onto the APCI needle, significant signal enhancement of protonated caffeine, with a mass-to-charge ratio (m/z) 195.1, was observed. FIGS. 5A-5C are ion chronograms and time-averaged mass spectra of caffeine. FIG. 5A shows the signal response of caffeine (m/z 195.1) to APCI activation (extracted ion chromatogram). SAWN was continuously applied, while APCI was manually switched on and off. FIG. 5B shows the time-averaged mass spectrum of caffeine with APCI "off" FIG. 5C shows the time-averaged mass spectrum of caffeine with APCI "on." With APCI activated, the caffeine signal suggests that by leveraging the abundant neutrals, overall ionization efficiency was increased by 3 orders of magnitude. In a control experiment, a droplet of the same caffeine sample was directly exposed to the APCI needle without activating the SAWN; caffeine was not detected, as expected. Relying on surface evaporation alone, caffeine's low vapor pressure of $1.2\times10^{-9}$ bar limits its detection with the APCI needle near the bulk solution. Thus, the SAWN clearly contributed to the desorption process while coupling with APCI.

Figures 17A, 17B, 17C, 17D:
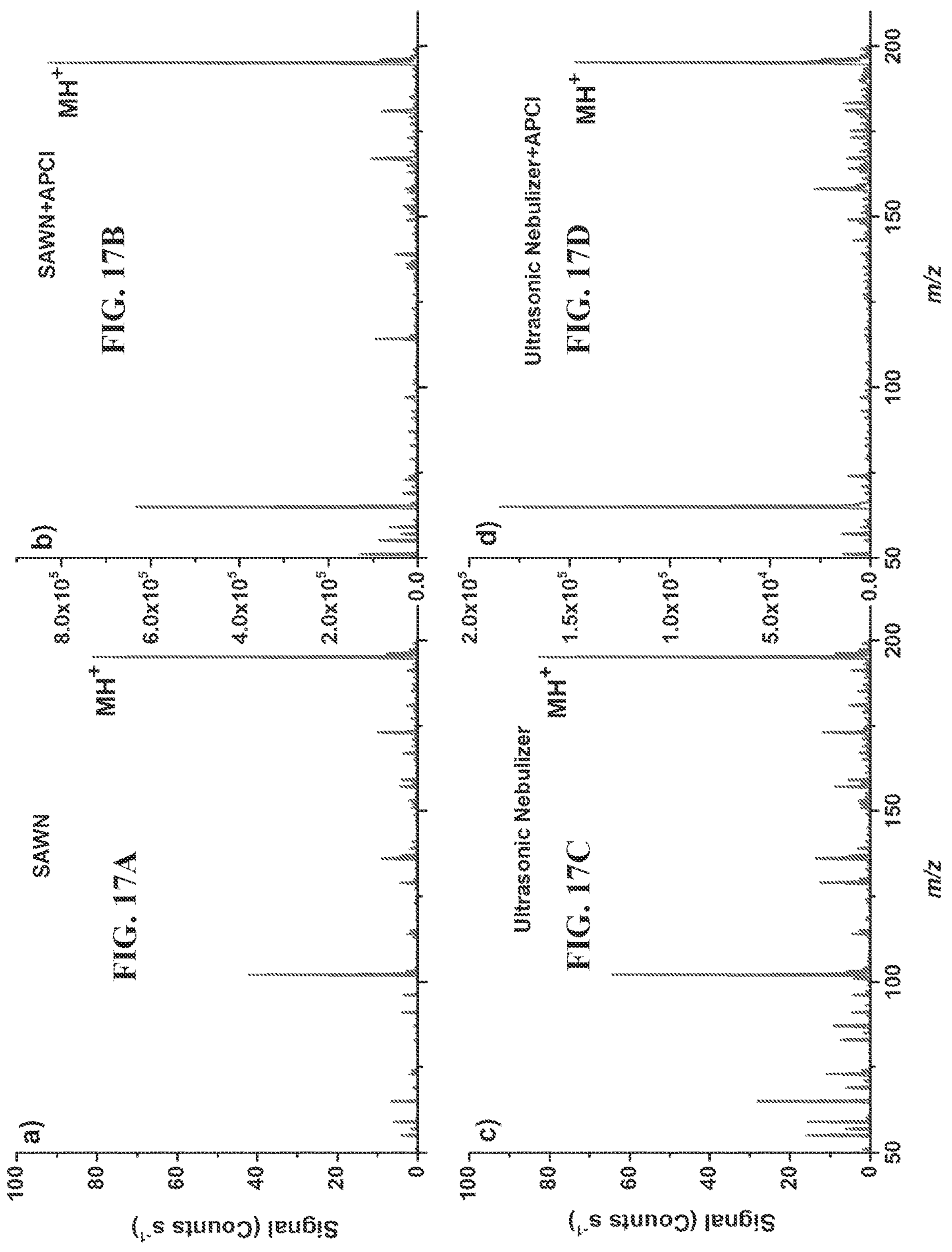
FIGS. 17A-17D show the mass spectra of 1 ppm caffeine with SAWN (FIG. 17A), SAWN+APCI (FIG. 17B), ultrasonic nebulizer (FIG. 17C), and ultrasonic nebulizer+APCI (FIG. 17D).

FIGS. 17A-17D show the mass spectra of 1 ppm caffeine with SAWN (FIG. 17A), SAWN+APCI (FIG. 17B), ultrasonic nebulizer (FIG. 17C), and ultrasonic nebulizer+APCI (FIG. 17D). Upon closer inspection of the mass spectra, for SAWN alone, the protonated molecular ion is barely discernible at this concentration. Notably, the base peak (m/z 216.8) is likely the sodium adduct of caffeine. By contrast, the mass spectrum recorded with the SAWN-APCI was found highly similar to that with an ESI source. Specifically, no sodium adduct was detected with the conventional ESI source. The SAWN-APCI clearly favors the formation of the protonated caffeine, where the base peak within the mass spectrum corresponds to MH+ at m/z 195.1. Notably, the sodium adduct is not observed with APCI. In this example, we calculate the signal-to-noise ratio for this same sample to go from about 220 to about 1730 for the base peak in each spectrum by implementing APCI.

Figures 6A, 6B:
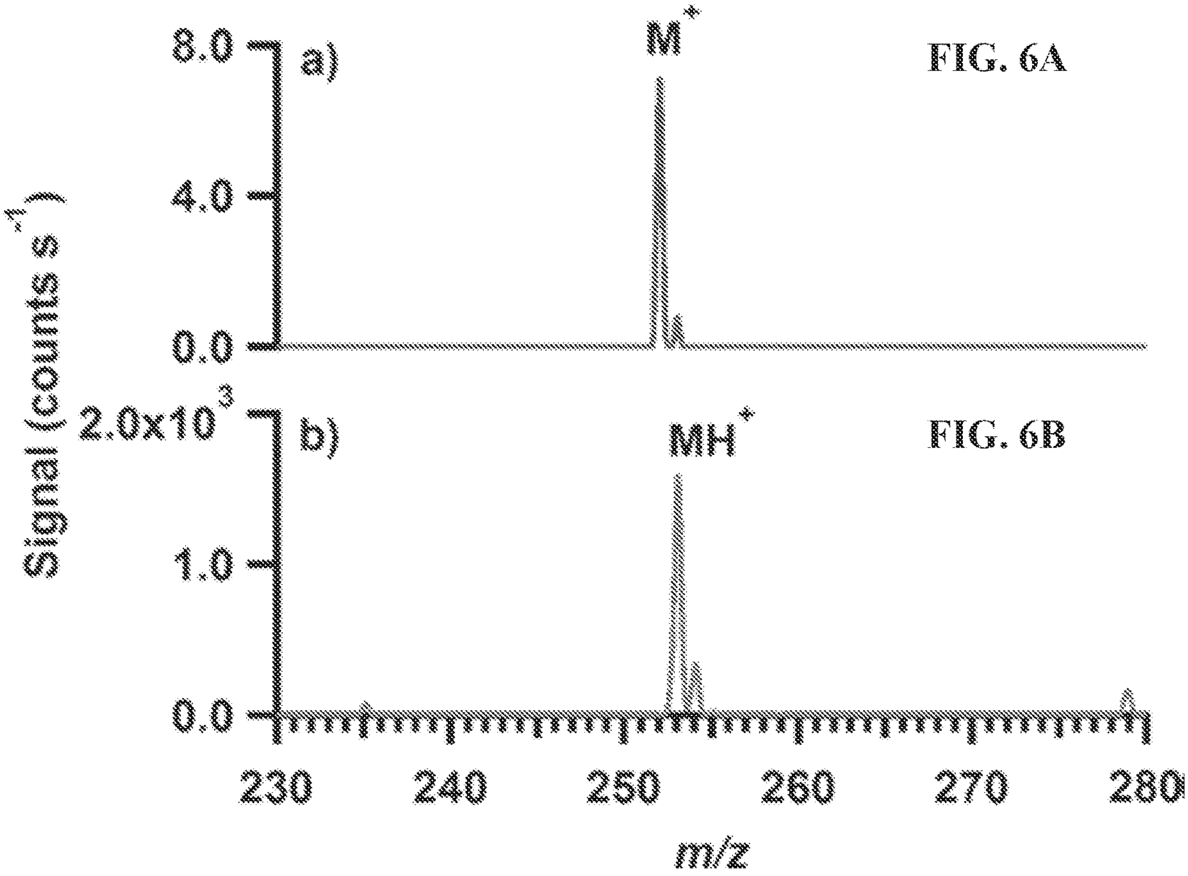
FIGS. 6A-6B show perylene mass spectra with APCI off (FIG. 6A) and with APCI on (FIG. 6B).
Figure 7:
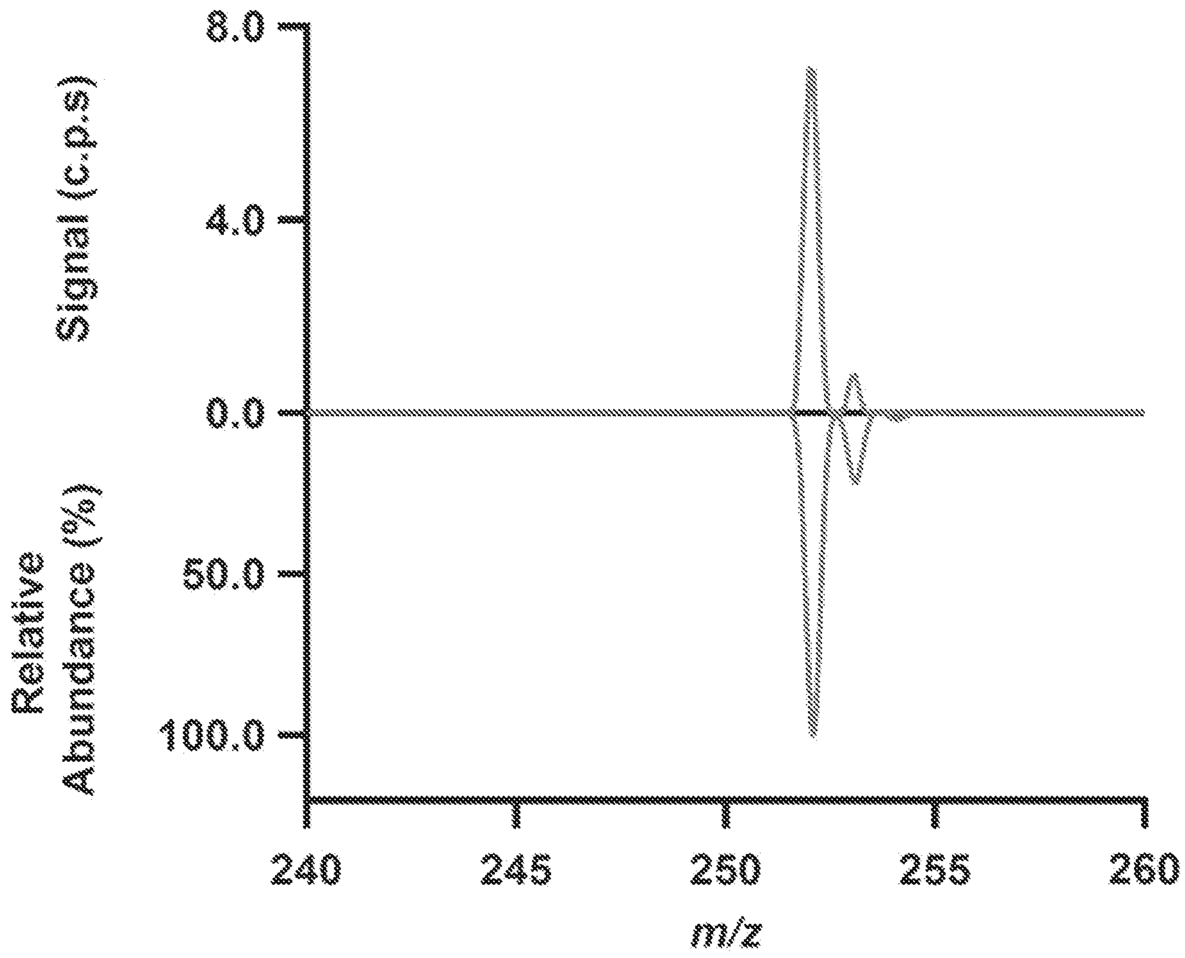
FIG. 7 shows a comparison between perylene mass spectra. The measured perylene mass spectrum from SAWN is shown on the positive axis. The simulated molecular perylene, M+, mass spectrum is shown on the negative axis.
Figures 18A, 18B, 18C, 18D:
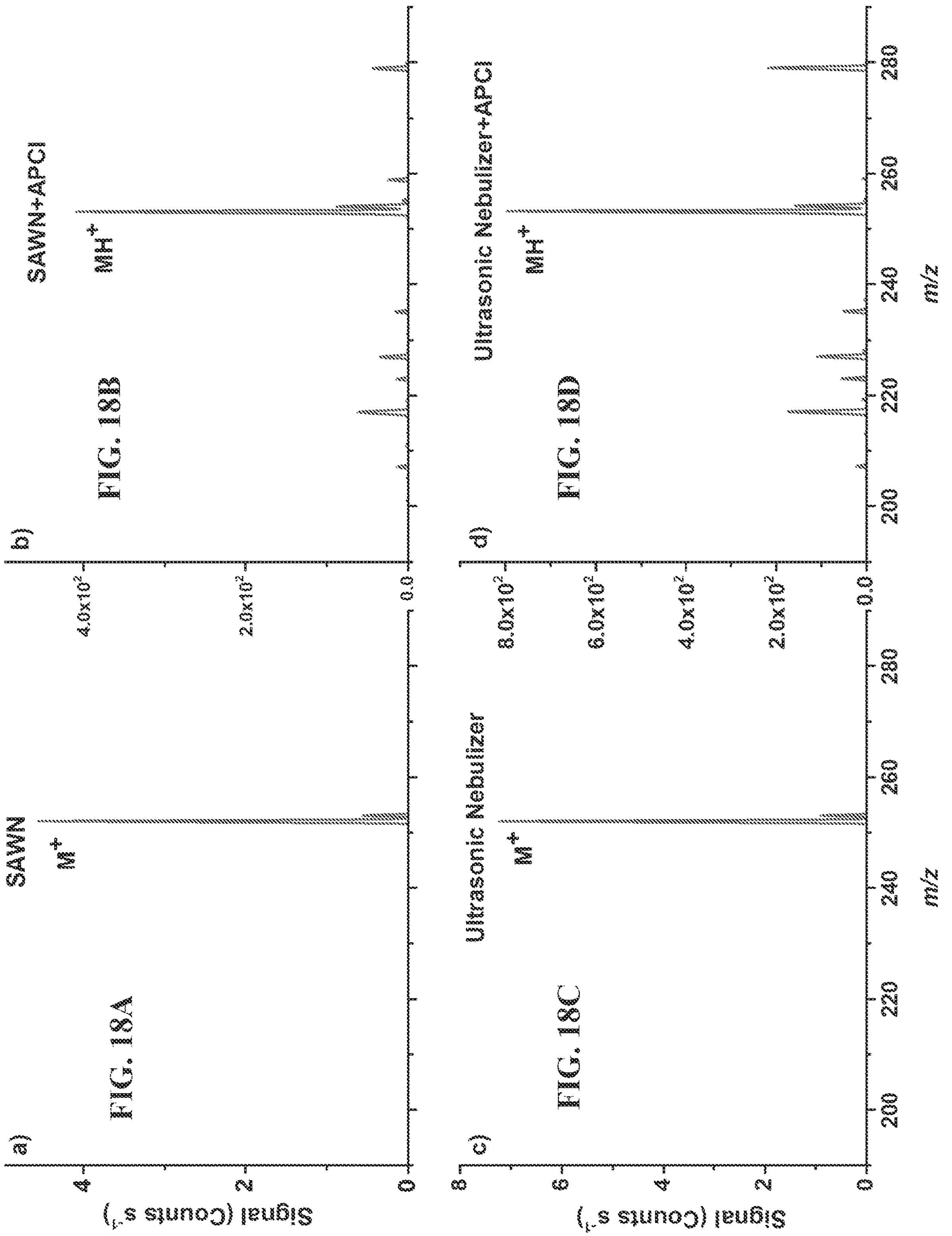
FIGS. 18A-18D show the mass spectra of 20 ppm perylene with SAWN (FIG. 18A), SAWN+APCI (FIG. 18B), ultrasonic nebulizer (FIG. 18C), and ultrasonic nebulizer+APCI (FIG. 18D).

In addition to polar analytes, APCI allows the ionization of nonpolar species. Thus, the SAWN-APCI approach was tested with a compound of low polarity. Molecular ions of perylene, a polycyclic aromatic hydrocarbon, were produced and detected from solution using SAWN alone and using SAWN-APCI. FIGS. 6A-6B show perylene mass spectra with APCI off (FIG. 6A) and with APCI on (FIG. 6B). FIG. 7 shows a comparison between perylene mass spectra. The measured perylene mass spectrum from SAWN is shown on the positive axis. The simulated molecular perylene, M+, mass spectrum is shown on the negative axis. FIGS. 18A-18D show the mass spectra of 20 ppm perylene with SAWN (FIG. 18A), SAWN+APCI (FIG. 18B), ultrasonic nebulizer (FIG. 18C), and ultrasonic nebulizer+APCI (FIG. 18D). Unlike caffeine, for which protonated ions were the major species, the mass spectrum of perylene with SAWN was dominated by singly charged perylene M+· at m/z 252.0. The signal is sufficient to also exhibit the expected 13C isotopic peak at m/z 253.0. For the mass spectrum obtained with SAWN-APCI, the M+· was below background level, while MH+ (m/z 253.1) was clearly observed. Instead of a charge-transfer mechanism, in which M+· is commonly produced, the ionization regime was likely dominated by processes such as proton transfer to produce the MH+·.

Example 6: SAWN-APCI for Large Molecules

Figure 8:
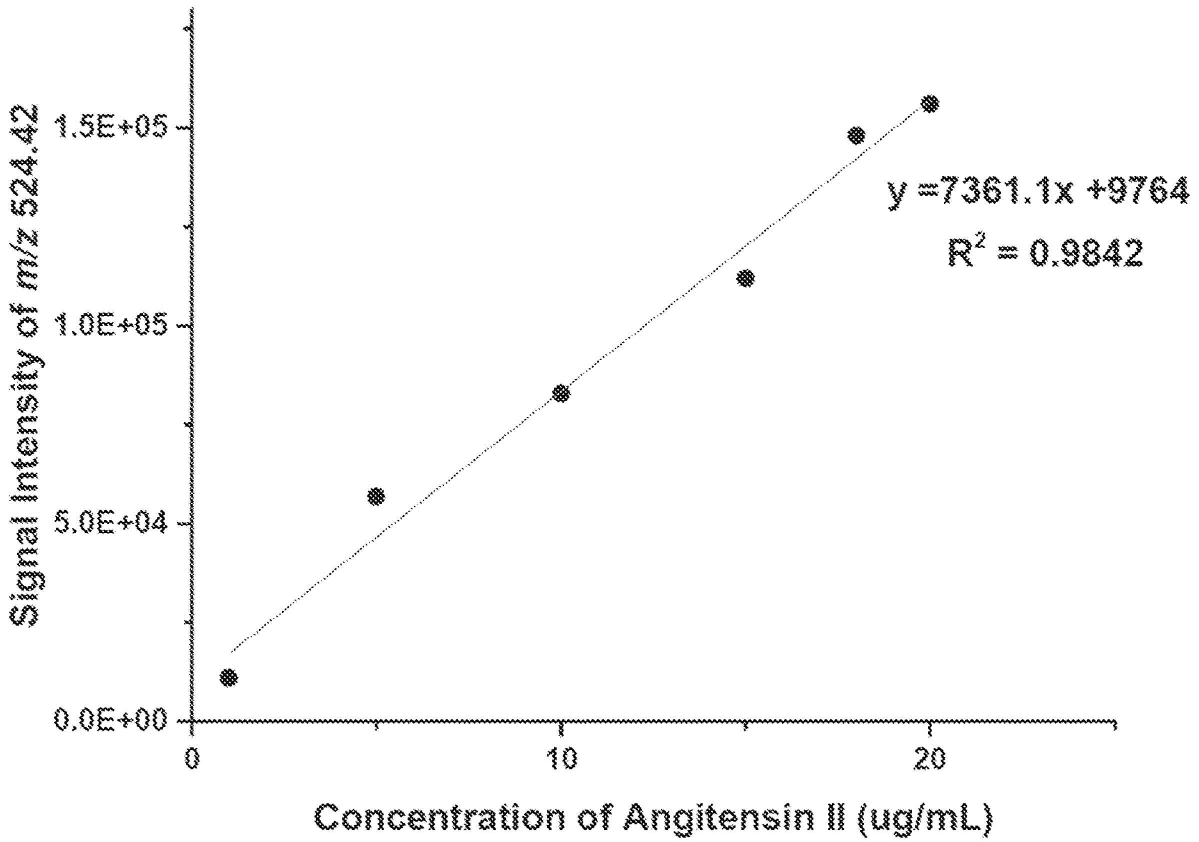
FIG. 8 shows a calibration curve for the analysis of Angiotensin II with the ion peak at m/z 524.42 in the range of 1 to 20 ppm.
Figures 16A, 16B, 16C, 16D:
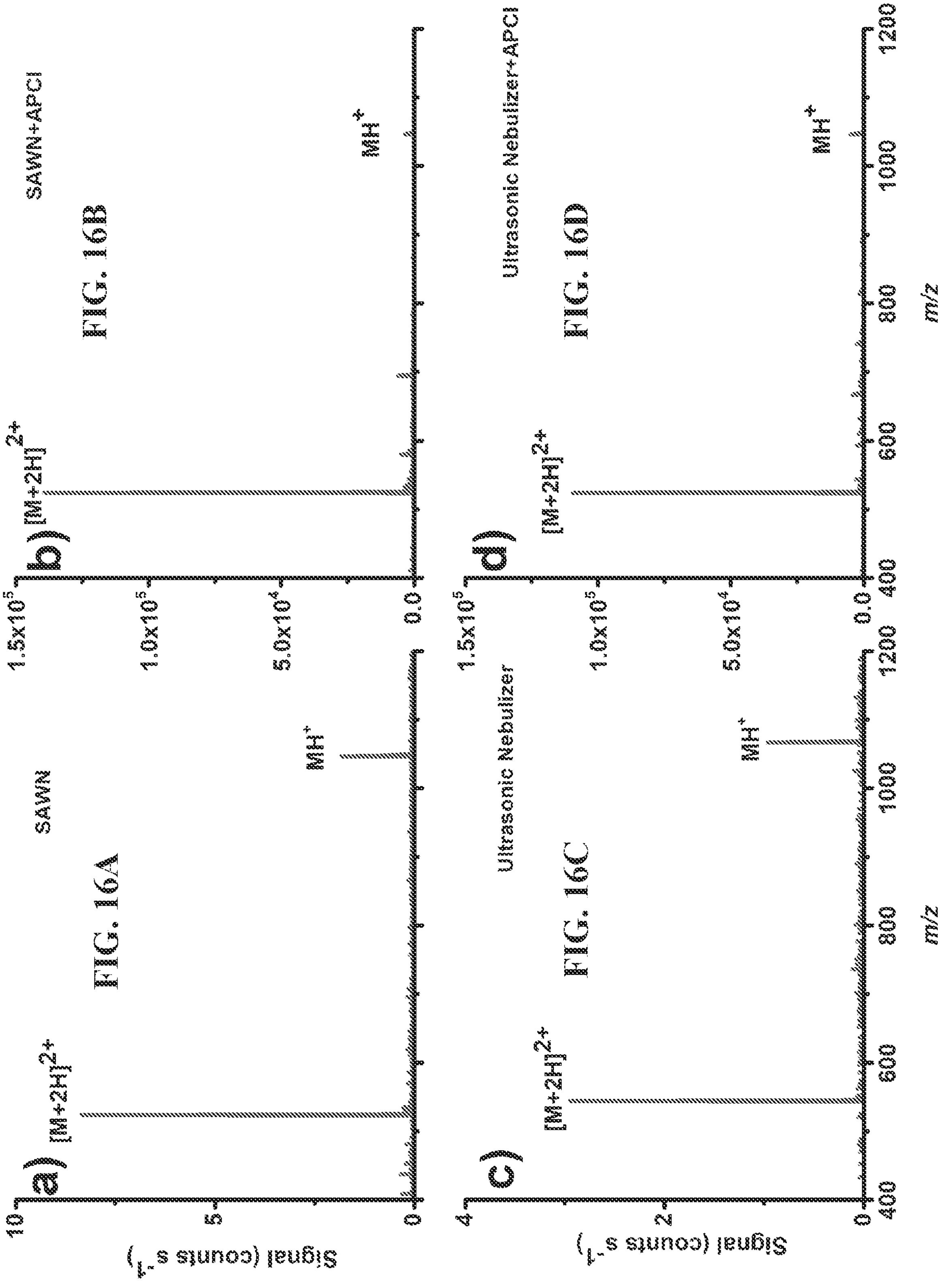
FIGS. 16A-16D show the mass spectra of 10 part per million (ppm) angiotensin II with SAWN (FIG. 16A), SAWN+APCI (FIG. 16B), ultrasonic nebulizer (FIG. 16C), and ultrasonic nebulizer+APCI (FIG. 16D).

To investigate the enhancement effect on molecules with larger mass, we used peptides as model samples to demonstrate the capabilities of the SAWN-APCI approach. In terms of peptide and protein analysis through SAWN-MS, it has been shown that biomolecules, such as proteins, are not denatured by the SAWN method because of the high acoustic frequency, which prevents cavitation and sheer degradation. However, as a result of the low ionization efficiency of SAWN itself, the addition of an ion funnel was needed to compensate for the overall poor sensitivity. Here, SAWN-APCI was implemented to analyze peptide samples without an ion funnel. The sample of angiotensin II (monoisotopic mass of 1046.2 g $mol^{-1}$) was analyzed to assess the SAWN-APCI ionization corresponding to $[M+2H]^{2+}$. Notably, for peptide analyses, APCI produces singly charged analyte ions with low ionization efficiency; it is not known to produce any multiply charged analyte ions. FIGS. 13A-13B show the mass spectra of angiotensin II with APCI off (FIG. 13A) and APCI on (FIG. 13B) with 10.0 μg/mL solution. FIGS. 16A-16D show the mass spectra of 10 part per million (ppm) angiotensin II with SAWN (FIG. 16A), SAWN+APCI (FIG. 16B), ultrasonic nebulizer (FIG. 16C), and ultrasonic nebulizer+APCI (FIG. 16D). The APCI activation led to the ion-signal enhancement for both $[M+2H]^{2+}$ and $MH^+$ by 4 orders of magnitude compared to SAWN alone. In addition, the ion signal of doubly charged angiotensin II at m/z 524.4 was comparable to that with a conventional ESI source (within 1 order of magnitude). We quantitatively assessed the SAWN-APCI approach from 1-20 μg/mL and observe excellent signal down to the lowest concentration studied (1 μg/mL). FIG. 8 shows a calibration curve for the analysis of Angiotensin II with the ion peak at m/z 524.42 in the range of 1 to 20 ppm.

Figure 9A:
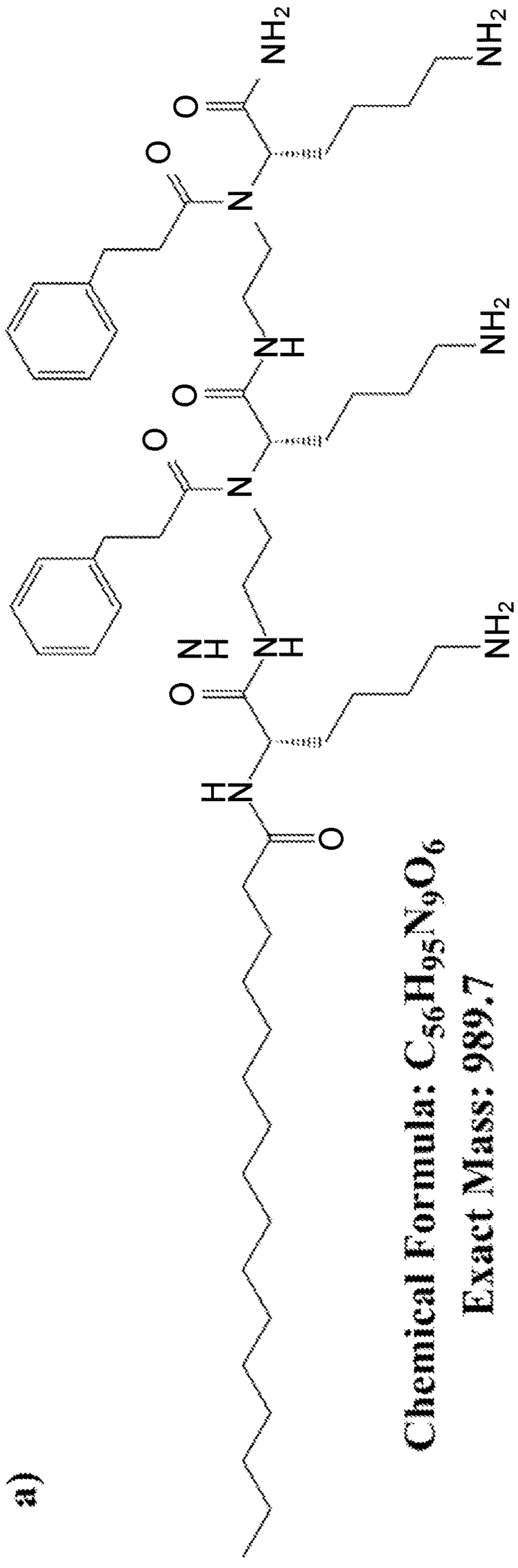
FIGS. 9A-9B show the chemical structure of Peptide-2 (FIG. 9A) and Peptide-1 (FIG. 9B).
Figure 9B:
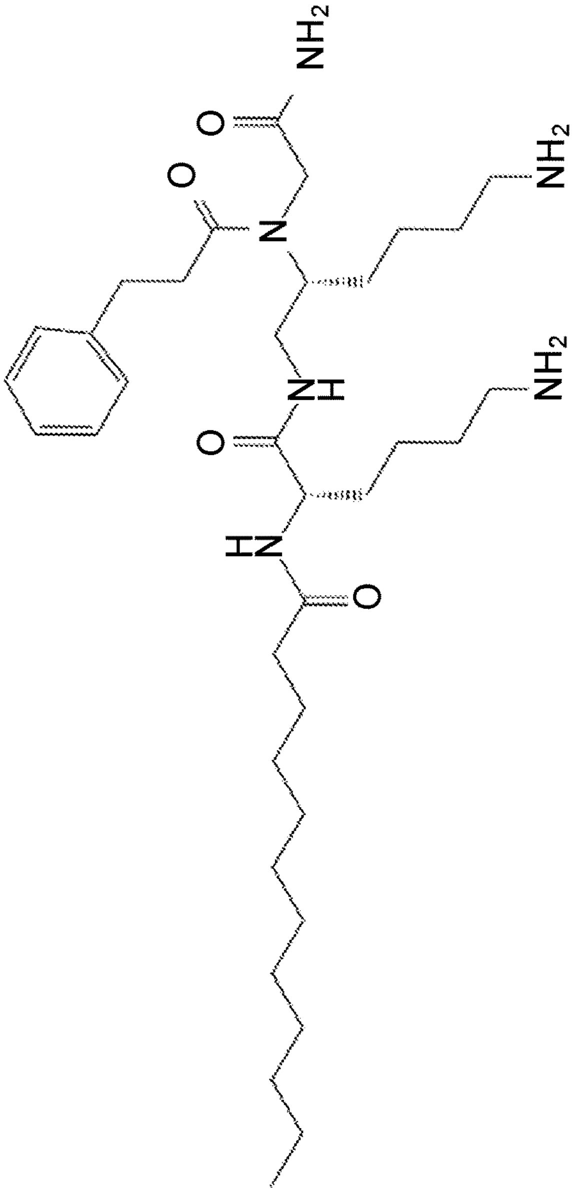
Figures 10A, 10B:
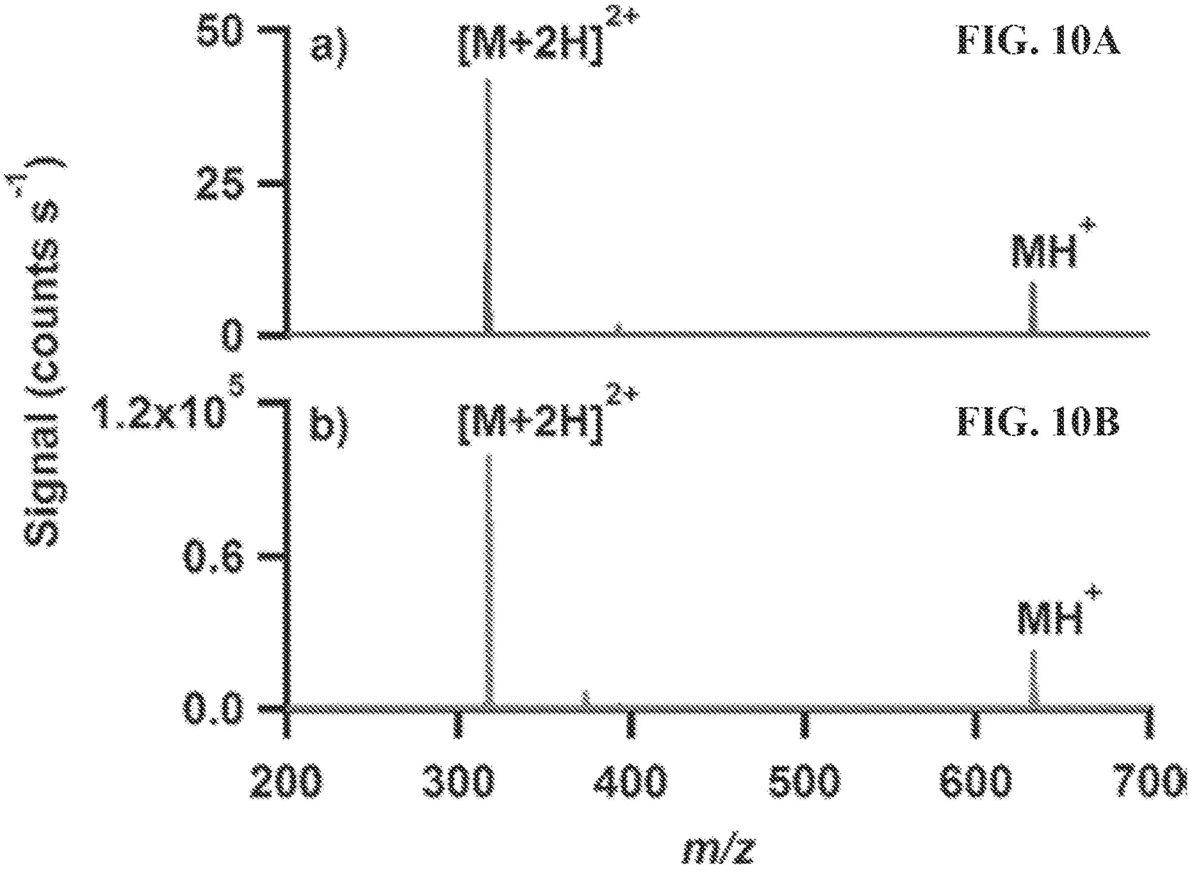
FIGS. 10A-10B show the mass spectra of Peptide-1 $C_{35}H_{62}N_6O_4$ (monoisotopic mass 630.5), with APCI off (FIG. 10A) and with APCI on (FIG. 10B).

When the same solution was analyzed with an ESI source, only [M+2H]2+ was detected without MH+. Such evidence suggests that alternative mechanisms for droplet ionization and desolvation may be at play, distinct from ESI. Following this, two synthetic peptides were investigated for their charge-state distributions and enhancement effects. FIGS. 9A-9B show the chemical structure of Peptide-2 (FIG. 9A) and Peptide-1 (FIG. 9B). A synthetic peptide featuring two basic lysines ($C_{35}H_{62}N_6O_4$, monoisotopic mass of 630.5 g $mol^{-1}$, termed Peptide-1) was tested with SAWN and SAWN-APCI approaches. FIGS. 10A-10B show the mass spectra of Peptide-1 $C_{35}H_{62}N_6O_4$ (monoisotopic mass 630.5), with APCI off (FIG. 10A) and with APCI on (FIG. 10B). The resulting mass spectrum obtained with SAWN showed singly and doubly charged analyte ions. Specifically, the singly charged analyte ion was 25% of the doubly charged. With APCI activation, ion signals of both MH+ and $[M+2H]^{2+}$ increased by almost 4 orders of magnitude without changing the charge-state distribution.

Figure 11:
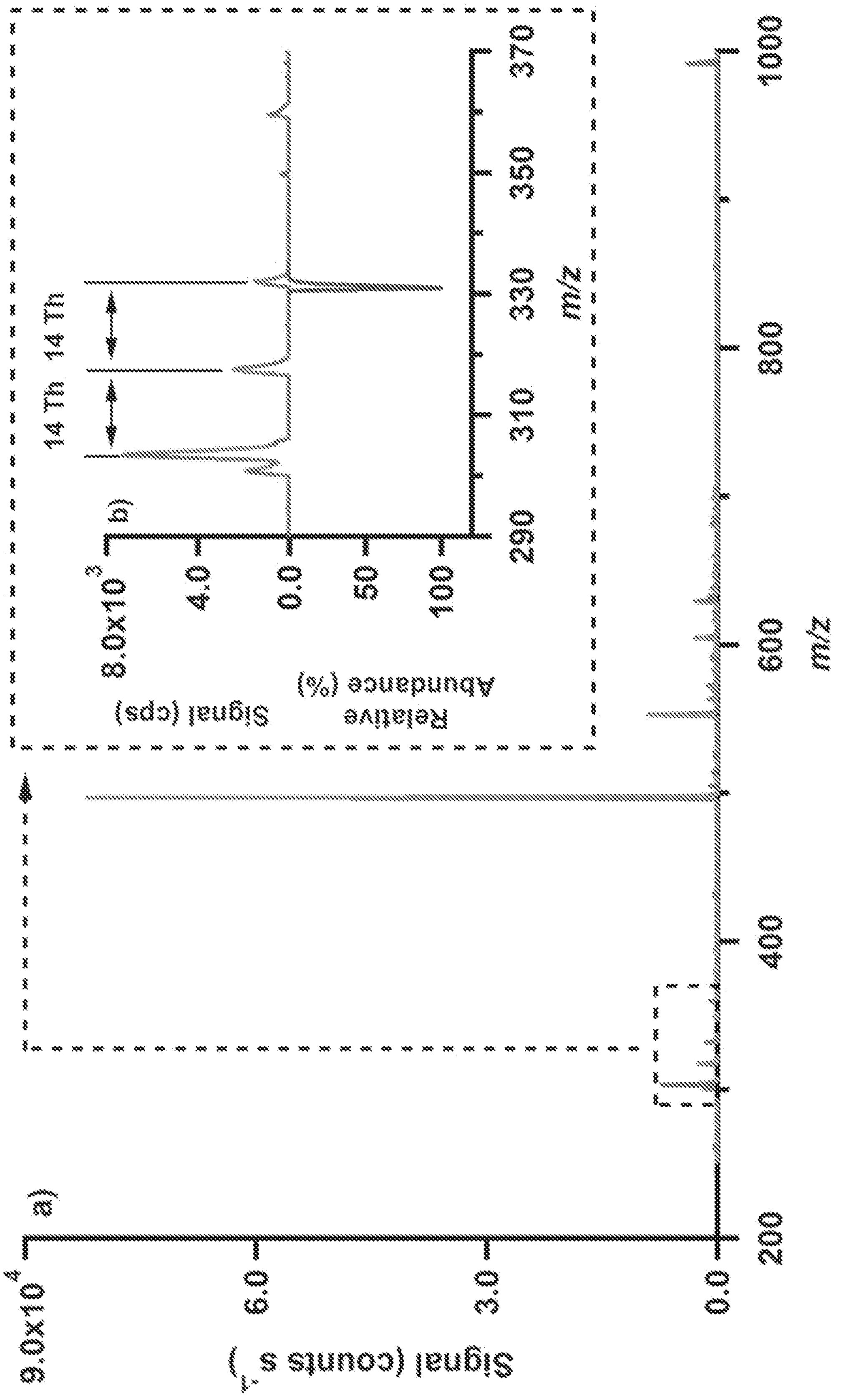
FIGS. 11A-11B show confirmation of triply charged Peptide-2.

FIGS. 11A-11B show confirmation of triply charged Peptide-2. FIG. 11A shows a SAWN-APCI mass spectrum of Peptide-2, and FIG. 11B is the zoomed view in the m/z range of 290 to 370. The positive axis is the recorded mass spectrum with SAWN-APCI for Peptide-2, and the simulated triply charged Peptide-2 is shown on the negative axis. A higher mass peptide ($C_{56}H_{95}N_9O_6$, monoisotopic mass of 989.7 g $mol^{-1}$, termed Peptide-2) incorporating three lysines, was also tested. FIGS. 14A-14B show the mass spectra of Peptide-2 $C_{55}H_{95}N_9O_6$ (monoisotopic mass=989.7 g mol-1) with APCI off (FIG. 14A) and on (FIG. 14B). Similarly, the ion signals of [M+2H]2+ and MH+ corresponding to Peptide-2 increased by 3 orders of magnitude, when the APCI was activated. In this case, the singly protonated ion is 10% of the doubly protonated. Notably, with the third lysine as a site for protonation, little [M+3H]3+ is observed in the lower mass range.

Example 7: Proposed Mechanism of SAWN-APCI Enhancement

The performance of SAWN as a sample introduction mechanism strongly depends on further investigation into its nebulization behavior. Thus, to further elucidate the mechanism of the enhanced ionization efficiency observed in this study, we theoretically calculated the mean particle diameter produced by the SAWN device used in our present work. The caffeine being dissolved in a methanol/water mixture of 50:50 volumetric ratio, the surface tension of the mixture was calculated with $$\sigma=y_a\sigma_a+y_b\sigma_b \quad \text{(Equation 2)}$$

where $y_a$ and $y_b$ are the fractions of components a and b, respectively, and $\sigma_a$ and $\sigma_b$ are the surface tensions of the pure component solvents. Note that the changes in surface tension induced by dissolving caffeine were neglected to simplify the calculation. The mean particle diameter was then calculated according to the laboratory temperature, i.e., 25° C., with $$d_{mean}=\kappa\cdot\lambda=\kappa\cdot\left(\frac{8\pi\sigma}{\rho f^2}\right)^{1/3} \quad \text{(Equation 3)}$$

where $d_{mean}$ is the mean particle/aerosol diameter, $\kappa$ is an empirically noted proportionality constant of 0.34$\sigma$ is the surface tension of the bulk solution, $\rho$ is the density, where 0.787 g/mL was used, and f is the frequency of the SAW, which is 9.56 megahertz (MHz). The mean particle diameter was determined to be about 300 nanometers (nm). As noted by Lang, the initial particle size distribution of ultrasonically generated particles is not considered monodisperse, and the vast majority (>90%) exhibit particle sizes less than twice the calculated, theoretical mean diameter. For a nominally similar ultrasonic nebulizer operating at 9.6 MHz, Kurosawa estimates that less than 5 in every 1000 solvent molecules is efficiently converted into the particulate phase. This phenomenon may be explained by the Kelvin curvature effect, which relates higher vapor pressures with diminishing particle size and is particularly relevant to sub-micrometer particles. By extension, the estimated majority of the small particles that we generate spans a critical border between favorable evaporation conditions and favorable coagulation/growth conditions. We then infer that, through efficient solvent evaporation, we observe very effective desorption of our neutral analytes through SAWN.

Nonetheless, particles of these sizes may still contain a significant number of molecules of analyte and solvent. With the presence of a strong electric field induced by the APCI needle, electrospray may occur on individual droplets during its transportation toward the inlet of the mass spectrometer. This phenomenon has been reported as in-flight electrospray. Verifying that the corona discharge at the APCI needle is key to ion-signal enhancement, the APCI source was modified. Instead of the conventional needle tip, a round tungsten bar (Φ=2 mm) with a polished spherical tip was used to avoid the formation of corona discharge. If in-flight electrospray on the microdroplets is the mechanism of ion-signal enhancement, the removal of the corona discharge should not affect the enhancement. In fact, no enhancement was observed without the presence of the corona plasma. In addition, the number of charged droplets that were formed during the rapid atomization was negligible compared to those induced by APCI. Thus, the enhancement of ionization can only be the result of the corona discharge and/or the reagent ions.

To further deduce the mechanism of enhanced ionization, we prevented direct exposure of the analyte-containing aerosols to the corona discharge by isolating the APCI plasma in a concealed chamber. FIG. 12 is an image of concealed APCI-SAWN setup. The corona discharge was established in an ionization source similar to the geometry of a DART and FAPA, where a pin anode and a ring cathode were used. Instead of using conventional helium as the discharge gas, we used nitrogen to sustain a corona plasma and guide the reagent ion species to exit the chamber. Unlike helium, which possesses a much lower density relative to air, the stream of nitrogen minimized the aerodynamic perturbation when the aerosols contact the reagent ions. To produce a comparable and steady reagent ion signal, the concealed source was operated in current-controlled mode with a discharge current of 7 microamperes (μA) at about 3 kilovolts (kV). To minimize the distortion from the ion plume generated by SAWN via the gas stream at the exit of the ionization source, a hole of Φ=6.00 mm was drilled and reamed to achieve a flow rate of 0.5 liters per minute (L/min). In contrast to a DART or FAPA source, the gas velocity of this source is about $3\times10^{-4}$ meters per second ($ms^{-1}$), whereas other sources are about 3 m $s^{-1}$. The combination of the concealed ionization source with SAWN resulted in signal enhancements of the protonated ion (MH+, m/z 195.1) of caffeine by $9.8\times10^1$.

Compared to the APCI with an exposed needle that provided $1.4\times10^3$ signal increment, this concealed APCI exhibited less ionization enhancement. This reduction may be related to the change of the geometry of the setup. Specifically, the SAWN chip was placed further upstream of the MS inlet because of the size of the concealed ionization source. Even so, our observations support the idea that the reagent ions comprise the most significant source of signal enhancement for small molecules like caffeine.

Example 8: Production of Doubly Charged Ions

The proton and charge-transfer regimes from an ADI source do not lead to the formation of multiply charged species because of Coulomb's force. In fact, ionization through reagent ions then requires multiple consecutive processes of charge/proton transfer. Yet, the doubly charged species dominates the spectrum, while APCI was activated. Thus, in addition to the reagent ion species that can improve the charging efficiency, the corona discharge also provides an additional ionization mechanism. In contrast, the use of APCI after an ESI source usually reduces the charges from the ionic species. However, the mostly neutral, fine droplets generated by the SAWN may behave differently than those that are charged.

Further investigations with Peptide-1 and Peptide-2 implied a dependency of the charge-state distribution upon the type of analyte. The ratio between singly to doubly charge ions changes from 25 to 10% while incorporating an additional lysine (as a site for protonation) in the peptide backbone between Peptide-1 and Peptide-2. Meanwhile, Peptide-1 with two lysines resulted in a mass spectrum highly similar to an ESI source. Both mass spectra exhibited singly charged ion signal at 25% of the doubly charged. FIG. 15 shows the Peptide-2 mass spectra obtained with an ESI source. In contrast, the ESI mass spectrum of Peptide-2 with three lysines exhibits singly charged ion signal at 2.7% of the doubly charged, which is notably smaller than the 10% observed with SAWN-APCI. We speculate that the charge residue mechanism is responsible for the doubly charged species. The fine droplet produced by SAWN enters the APCI discharge region, acquiring multiple charges because of its size while sustained in the corona plasma. During the desolvation, leftover charges bond to the binding site of the peptides similar to ESI processes. Unlike the Taylor cone region during electrospray, where the Rayleigh limit allows more charges per droplet, the interaction between the fine droplets and the corona plasma may be largely constrained by Coulomb's law. Experimentally, this difference can be appreciated by the observation of the triply protonated Peptide-2 in a conventional ESI source, while arguably, no triply charged ions were detected with SAWN-APCI.

Example 9: Mass Spectra of Cytochrome C Using Ultrasonic Nebulizer-APCI

Figure 19A:
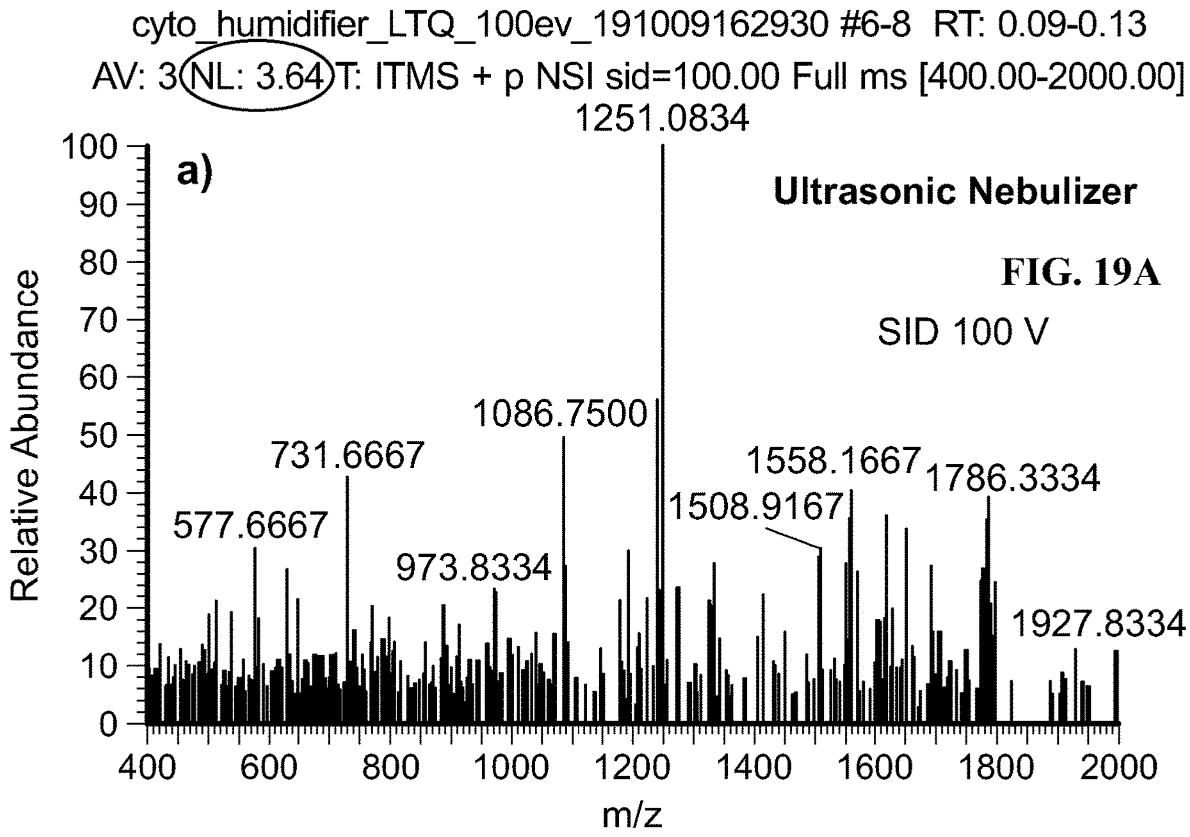
FIGS. 19A-19C show the mass spectra of 10 ppm cytochrome C with ultrasonic nebulizer (FIG. 19A), ultrasonic nebulizer+APCI (FIG. 19B), and ESI (FIG. 19C).
Figure 19B:
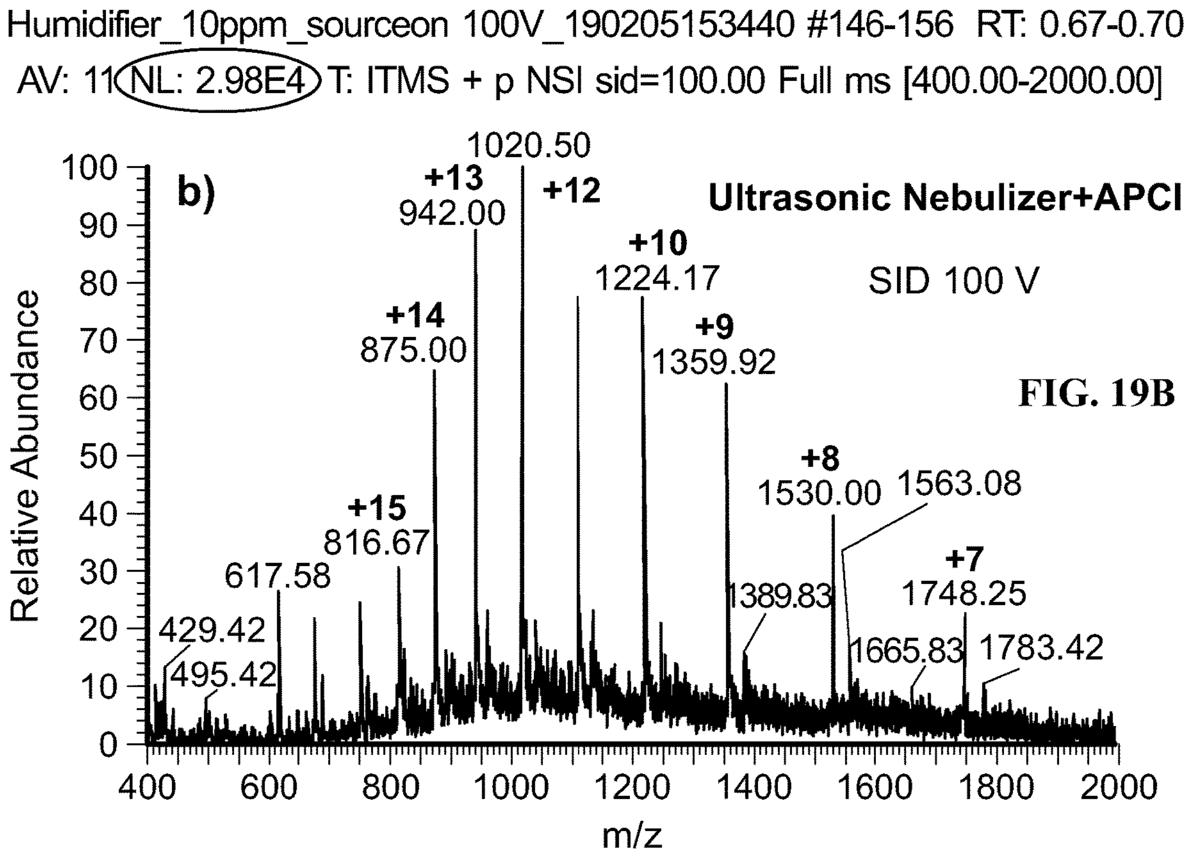
Figure 19C:
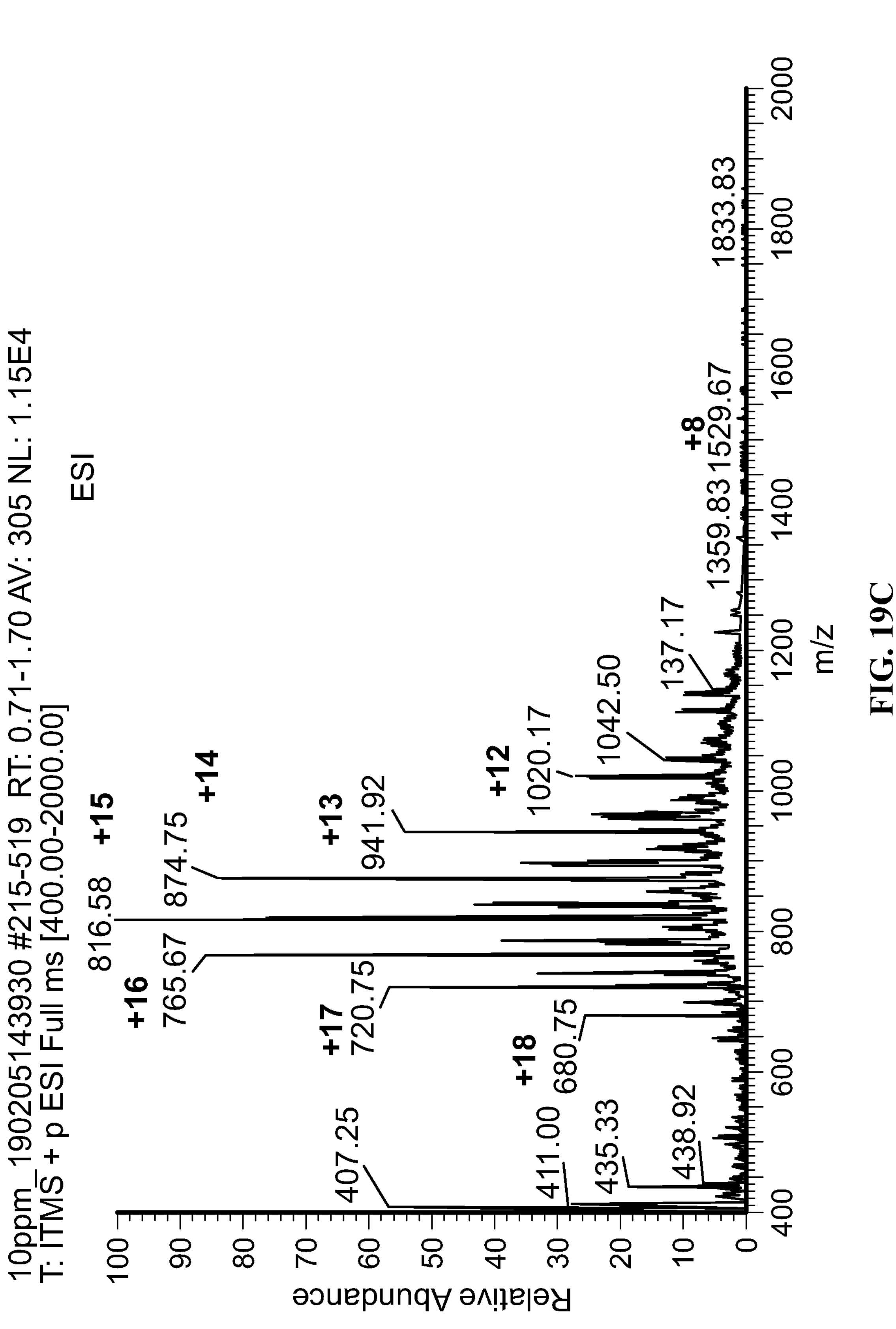

FIGS. 19A-19C show the mass spectra of 10 ppm cytochrome C with ultrasonic nebulizer (FIG. 19A), ultrasonic nebulizer+APCI (FIG. 19B), and ESI (FIG. 19C). As depicted in FIGS. 19A-19C, charge reduction is observed (i.e., a low charge state is observed in the spectra taken using the ultrasonic nebulizer in comparison to the spectrum taken using ESI).

Example 10: Mass Spectra of Analytes Using Ultrasonic Nebulizer-APCI

Figure 20A:
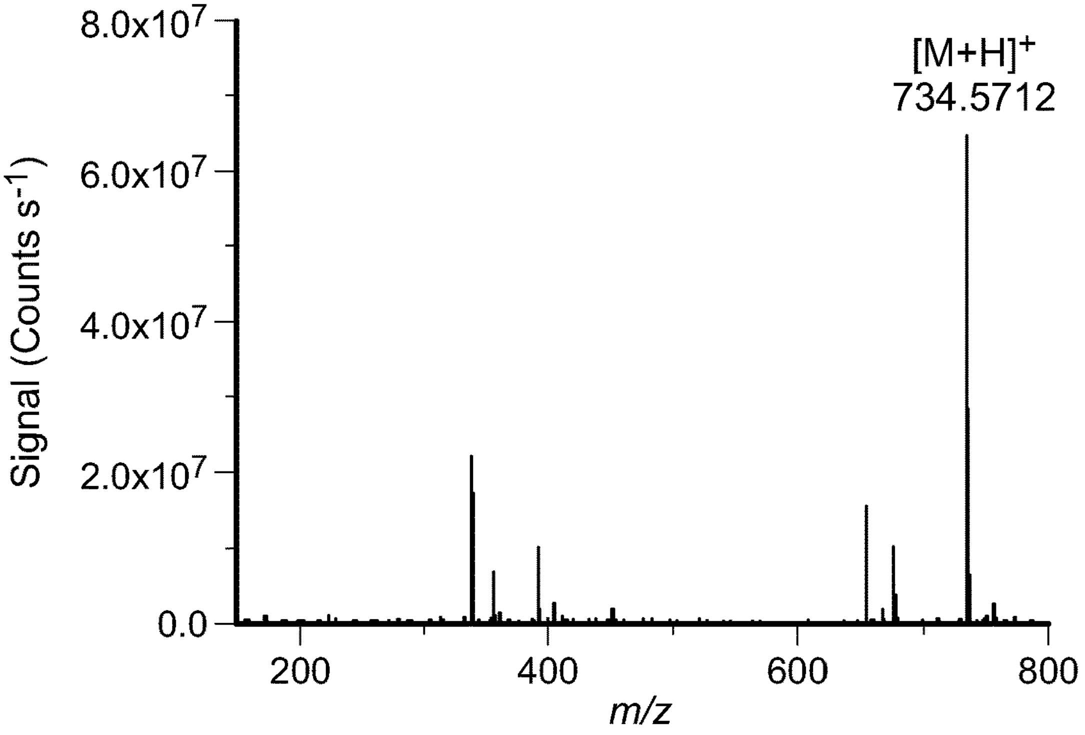
FIG. 20A depicts a mass spectrum of 100 ppm dipalmitoylphosphatidylcholine (DPPC) with ultrasonic nebulizer-APCI.
Figure 20B:
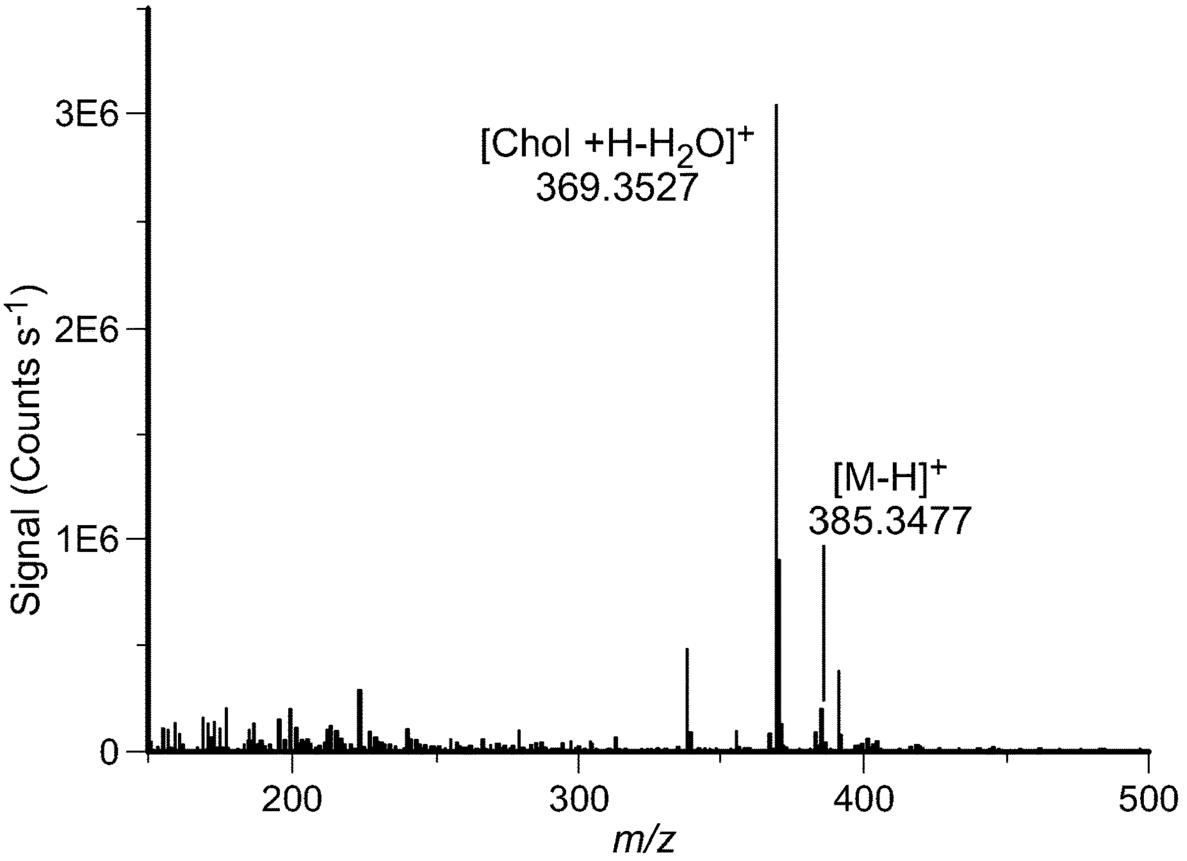
FIG. 20B depicts a mass spectrum of 100 ppm cholesterol with ultrasonic nebulizer-APCI.
Figure 20C:
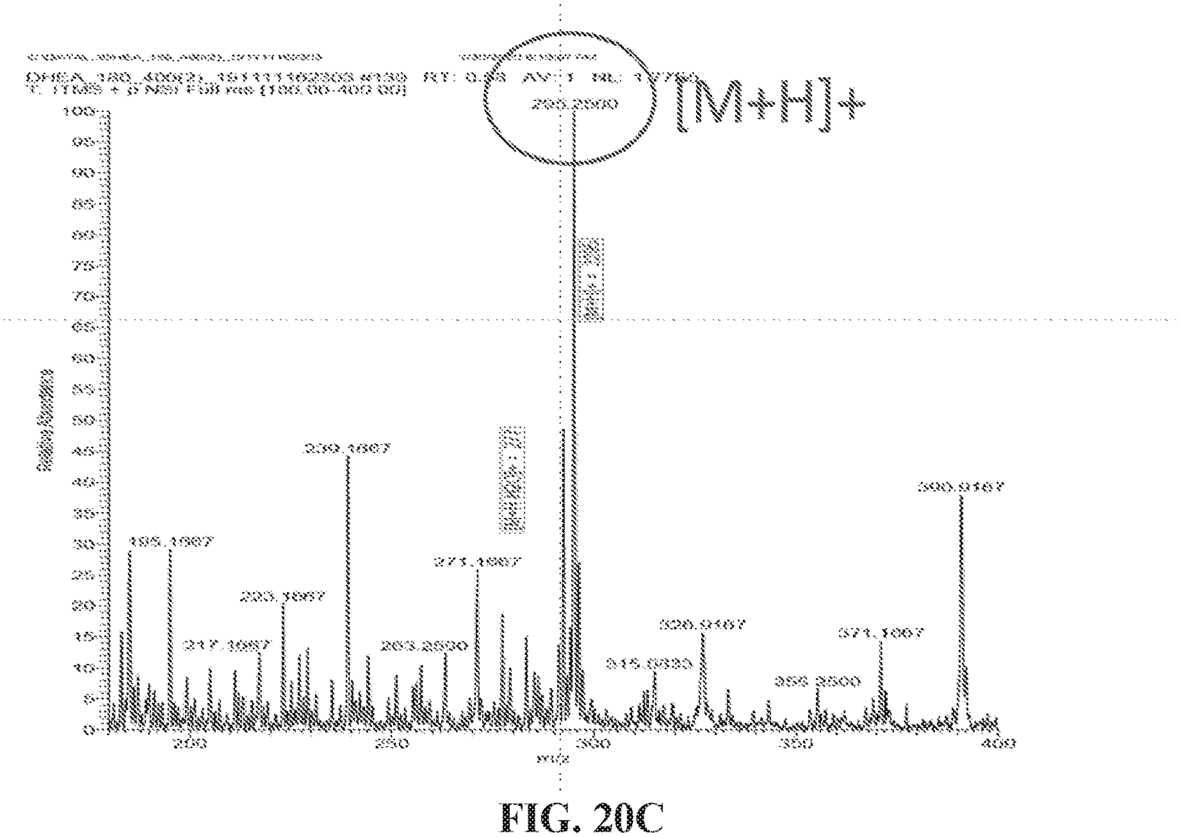
FIG. 20C depicts a mass spectrum of d6-dehydroepiandrosterone (DHEA) with ultrasonic nebulizer-APCI.
Figure 20D:
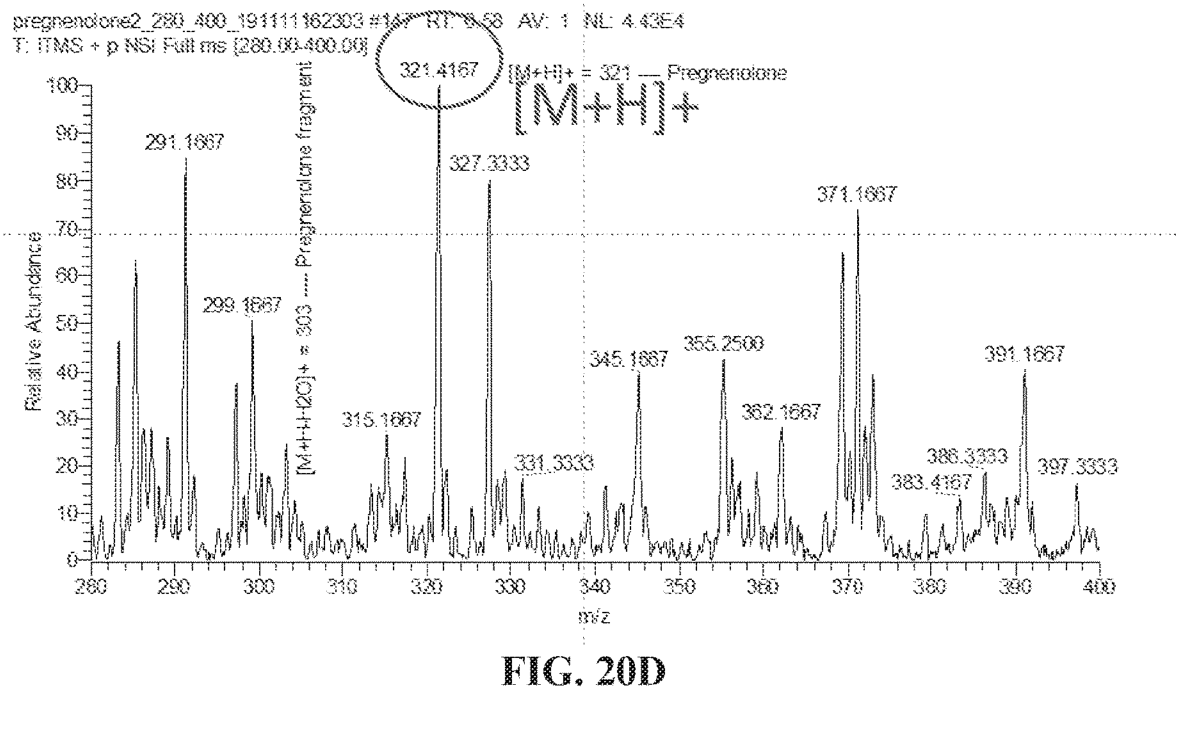
FIG. 20D depicts a mass spectrum of pregnenolone with ultrasonic nebulizer-APCI.
Figure 20E:
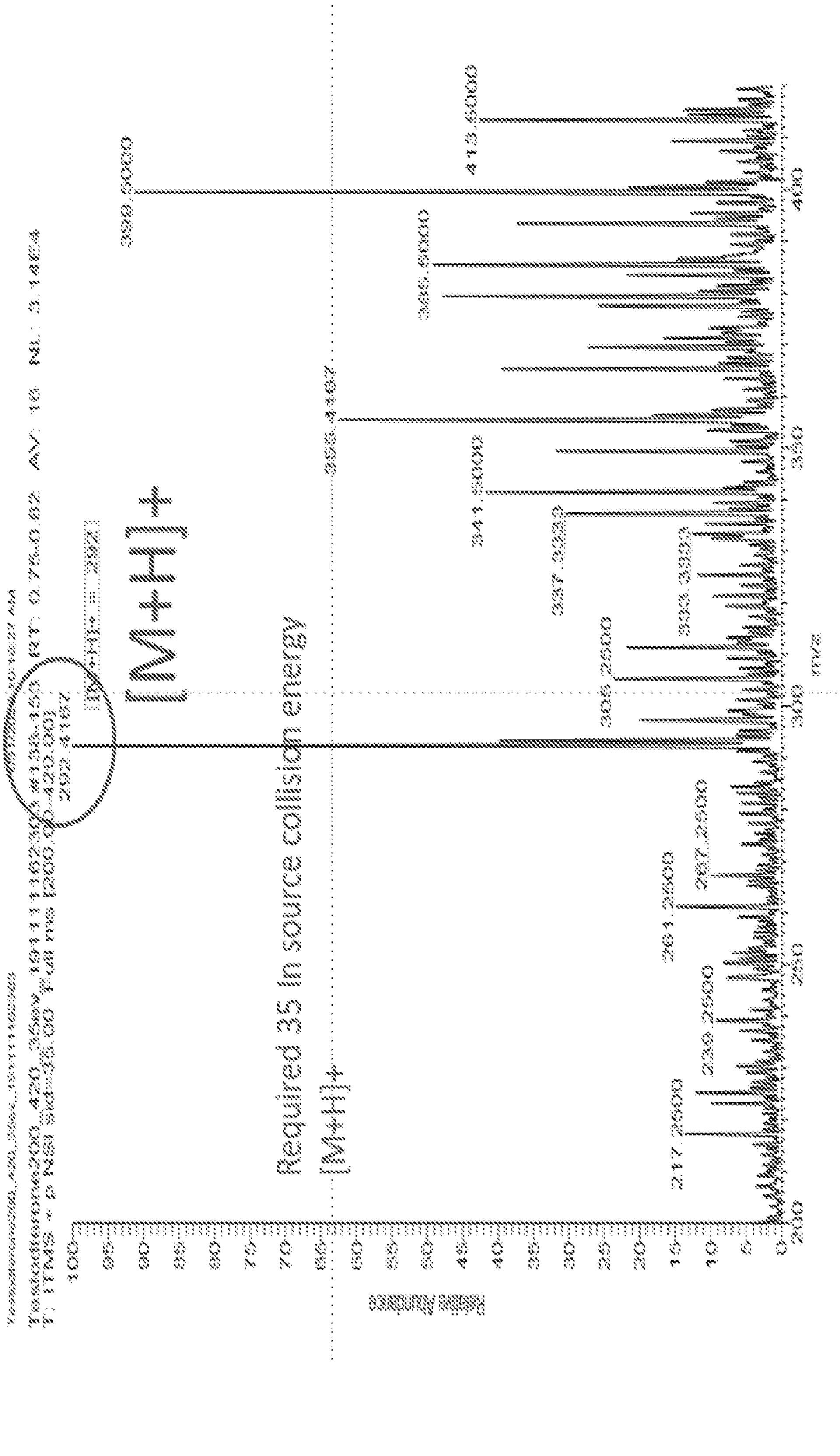
FIG. 20E depicts a mass spectrum of testosterone with ultrasonic nebulizer-APCI.

FIG. 20A depicts a mass spectrum of 100 ppm dipalmitoylphosphatidylcholine (DPPC) with ultrasonic nebulizer-APCI. FIG. 20B depicts a mass spectrum of 100 ppm cholesterol with ultrasonic nebulizer-APCI. FIG. 20C depicts a mass spectrum of d6-dehydroepiandrosterone (DHEA) with ultrasonic nebulizer-APCI. FIG. 20D depicts a mass spectrum of pregnenolone with ultrasonic nebulizer-APCI. FIG. 20E depicts a mass spectrum of testosterone with ultrasonic nebulizer-APCI (35 eV in source collision energy).

Example 11

Figure 21:
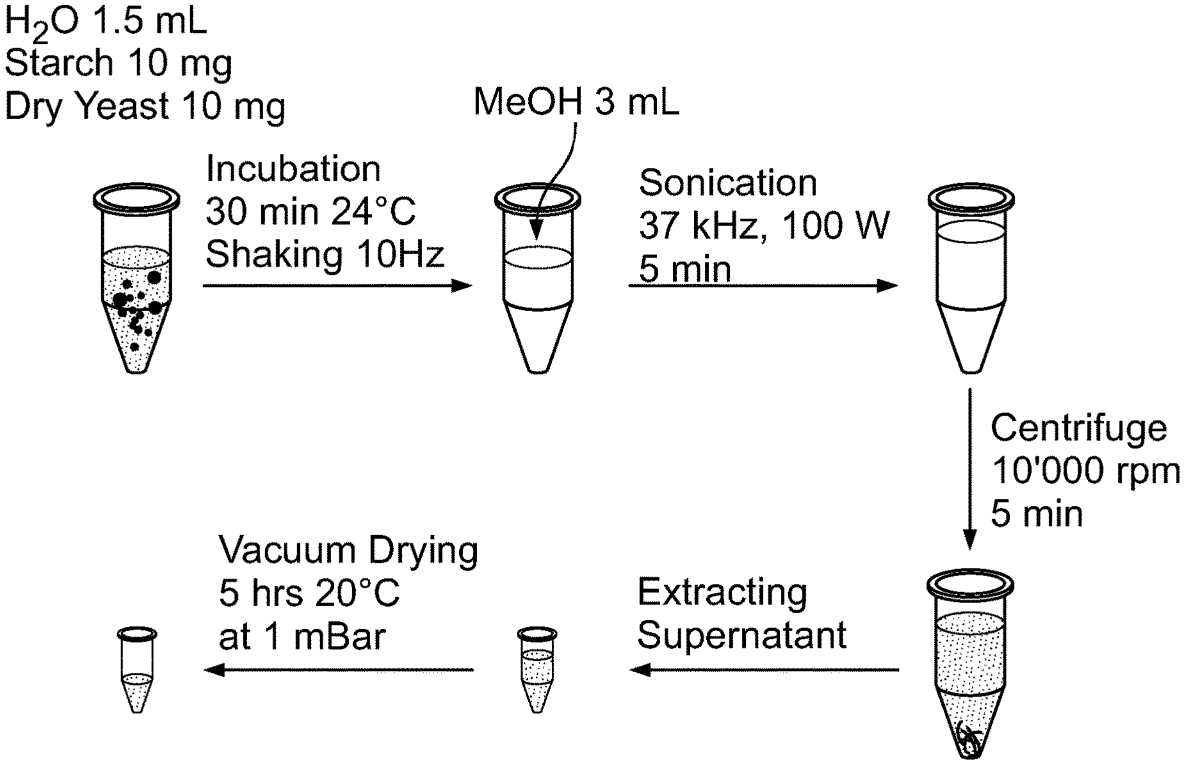
FIG. 21 depicts the steps used to prepare a sample of yeast extract for use in the ultrasonic nebulizer.
Figure 22A:
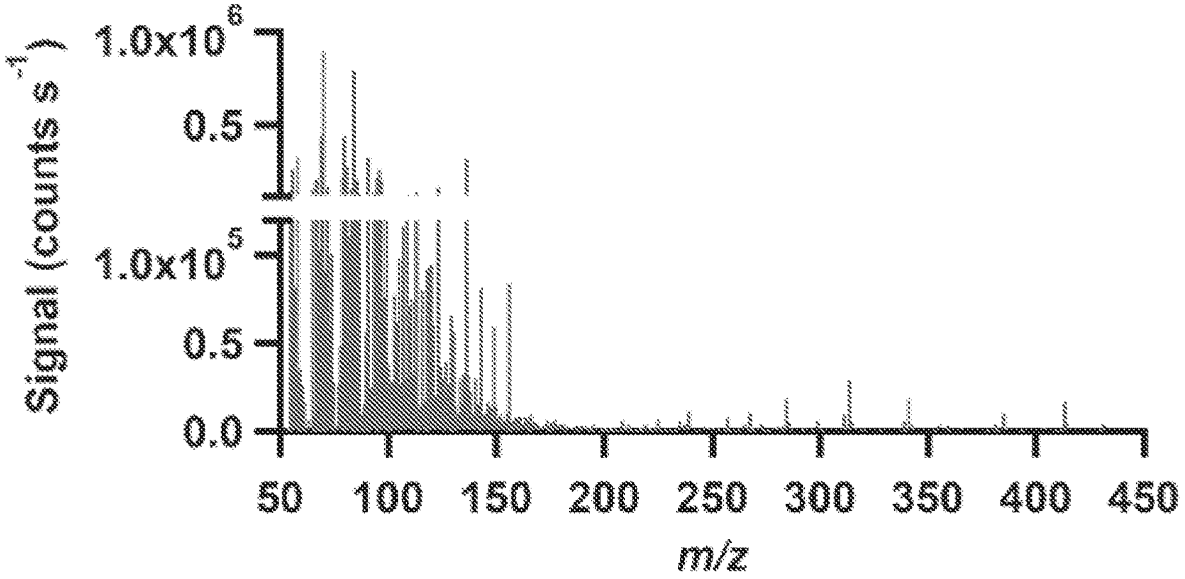
FIG. 22A depicts a mass spectrum of betaine.
Figure 22B:
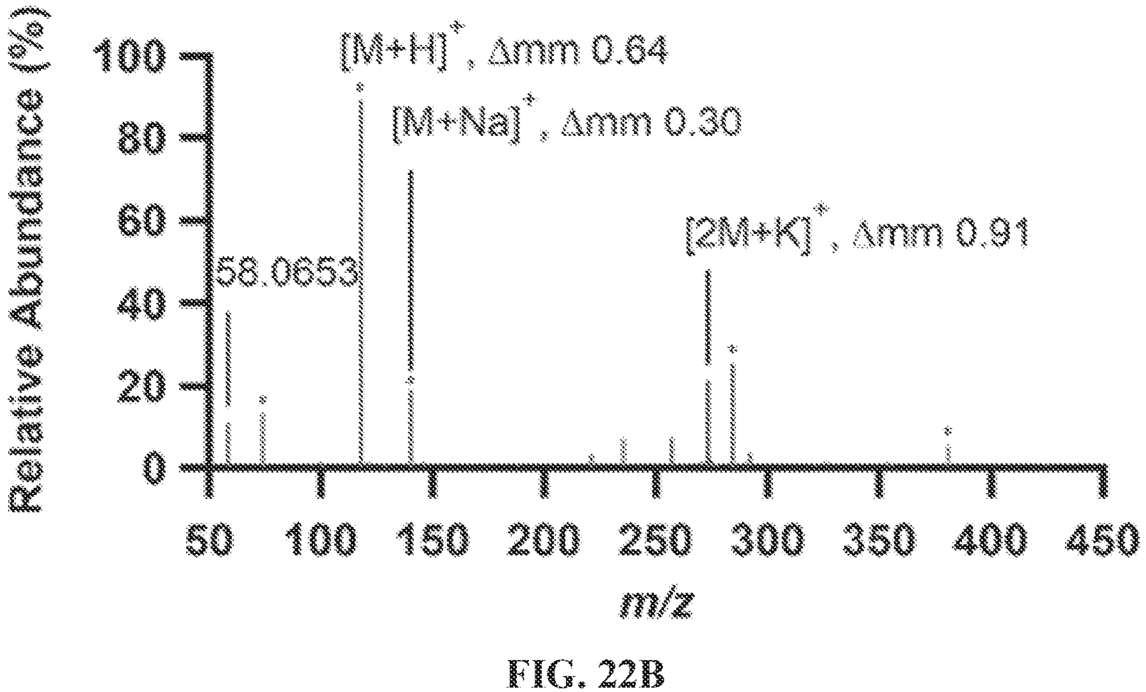
FIG. 22B depicts a reassembled mass spectrum of betaine.
Figure 22C:
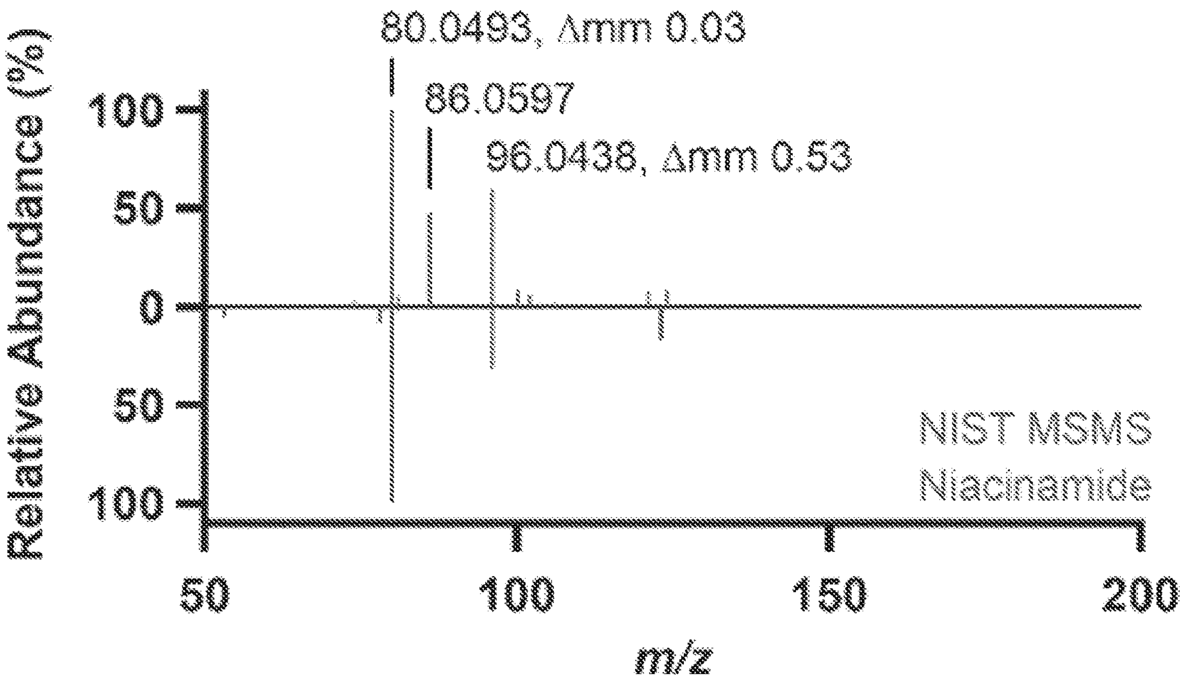
FIG. 22C depicts the experimental and library mass spectra of niacinamide

The method was further tested with a complex sample matrix to further test its analytical capacity towards real-life applications. As a demonstration, yeast extract was used as a model sample system to show the potential of ultrasonic-nebulization-based methods in rapid and general-purpose metabolomics. FIG. 21 depicts the steps used to prepare this omdel sample system. The preparation of the modal sample was conducted according to the following protocol. Dry yeast was purchased from a local grocery store. 10.1 mg of the yeast was incubated in aqueous starch solution for 30 min. Thereafter, the metabolomes were extracted by adding methanol to a final volumetric ratio of 67%. Then the solution was sonicated for 5 min. After centrifuge for 5 min at 10,000 rpm (ca. 3000 G), the supernatant solution was vacuum dried for 4 hours at 1 mbar to increase the concentration by a factor of approximately 3. 7 uL of yeast extract was applied to the surface of the ultrasonic nebulizer as-is. Thereafter, the ultrasonic nebulizer was activated for approximately 4 seconds for complete nebulization of the sample. During this nebulization period, the measuring mass spectrometer was already recording mass spectra while the APCI source was also activated to interact with the analyte-containing droplets and analyte molecules. The reason for pulsed-mode operation is that the ultrasonic nebulization process induced inhomogeneities (e.g., gas-phase composition) into the discharge environment, which modulated the transient ion signals with respect to different chemical species. Consequently, different ions that are associated with one analyte (e.g., fragment, adducts, oxidation products) exhibited distinctive chronogram structures. A mathematical algorithm was used to isolate the ions that share the same chronogram structure from a time-averaged mass spectrum; in such a fashion that analyte-specific mass spectra can be reassembled. During the 1-min experimental interval, 1419 ion peaks were detected in the mass range of 50-1000 from the time-averaged mass spectrum. To assign identities to the reassembled mass spectra, we used mass-spectral library search because the mass spectra generated from this platform is, in general, compatible with existing libraries. Based on the mass-spectral library search, betaine was one possible analyte. The possible ion forms of betaine were directly looked-up based on the accurate mass. A similar case was niacinamide. From the results of spectral library match, the precursor ions were searched manually. We located the protonated niacinamide at m/z 123.0553 ($\Delta$mm=0.19 mTh). Thus, another example group was assigned to niacinamide. FIG. 22A depicts the mass spectrum of betaine, wherein the lines represent the individual detected ions during the entire sampling period. FIG. 22B depicts the reassembled mass spectrum of betaine, wherein the lines represent the ions that are related to betaine, and the abundances of the lines that do not include an overhead asterisk are lines that were multiplied by 10. FIG. 22C depicts the experimental (positive axis) and library (negative axis) mass spectra of niacinamide.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. An analytical system for analyzing an analyte, the analytical system comprising:

a mass spectrometer having an input;

an ultrasonic nebulizer chip operatively coupled to the mass spectrometer, such that when the ultrasonic nebulizer chip nebulizes the analyte to provide a nebulized analyte, at least some of the nebulized analyte enters the input of the mass spectrometer;

wherein the ultrasonic nebulizer chip comprises a continuous-mode driver;

wherein the ultrasonic nebulizer chip is operatively coupled with an atmospheric pressure chemical ionization device;

wherein the atmospheric pressure chemical ionization device has an ionization efficiency greater than an ionization efficiency produced by the atmospheric pressure chemical ionization device alone.

2. The analytical system of claim 1, wherein the ultrasonic nebulizer chip operatively coupled with the atmospheric pressure chemical ionization device has a first ionization efficiency that is greater than a third ionization efficiency produced by a surface acoustic wave nebulization device alone.

3. The analytical system of claim 1, wherein the ultrasonic nebulizer chip comprises an ultrasonic piezoelectric transducer.

4. The analytical system of claim 1, wherein the atmospheric pressure chemical ionization device ionizes the analyte to provide an ionized analyte, wherein at least some of the ionized analyte enters the input of the mass spectrometer.

5. The analytical system of claim 1, further comprising an electronic data acquisition system in electronic communication with the mass spectrometer, wherein the electronic data acquisition system processes a plurality of signals provided by the mass spectrometer, wherein the electronic data acquisition system comprises at least one analog-to-digital converter producing digitized data from the plurality of signals provided by the mass spectrometer.

6. The analytical system of claim 5, wherein the at least one analog-to-digital converter produces the digitized data from the plurality of signals in a time interval of about 5 seconds.

7. The analytical system of claim 5, wherein the plurality of signals comprises a mass spectrum of the analyte.

8. The analytical system of claim 1, wherein the analyte is a polar analyte, a non-polar analyte, a lipid, a biomolecule, or any combination thereof.

9. The analytical system of claim 1, wherein the analyte is a molecule having a molecular weight of about 50 daltons to about 1500 daltons.

10. The analytical system of claim 1, wherein the analyte is a liquid analyte that contacts a surface of the ultrasonic nebulizer chip.

11. A method for analyzing an analyte, the method comprising:

contacting the analyte with a surface of the ultrasonic nebulizer chip;

introducing the analyte to the input of the mass spectrometer, wherein the analyte is a liquid analyte;

delivering the liquid analyte to the surface of an ultrasonic nebulizer chip at a flow rate of about 1 to about 20 microliters per minute (μL/min);

nebulizing a suspension of the liquid analyte in a solvent with the ultrasonic nebulizer chip to provide a nebulized suspension wherein the ultrasonic nebulizer chip is operatively coupled to a mass spectrometer having an input; and performing mass spectrometry on the nebulized suspension.

12. The method of claim 11, further comprising using a continuous-mode driver of the ultrasonic nebulizer chip while nebulizing the suspension of the analyte.

13. The method of claim 11, wherein the ultrasonic nebulizer chip is operatively coupled with an atmospheric pressure chemical ionization device.

14. The method of claim 13, wherein the ultrasonic nebulizer chip operatively coupled with the atmospheric pressure chemical ionization device has an ionization efficiency that is greater than an ionization efficiency produced by the atmospheric pressure chemical ionization device alone.

15. The method of claim 13, wherein the atmospheric pressure chemical ionization device ionizes the analyte to provide an ionized analyte, wherein at least some of the ionized analyte enters the input of the mass spectrometer.

16. An analytical system for analyzing an analyte, the analytical system comprising:

a mass spectrometer having an input;

an ultrasonic nebulizer chip operatively coupled to the mass spectrometer, such that when the ultrasonic nebulizer chip nebulizes the analyte to provide a nebulized analyte, at least some of the nebulized analyte enters the input of the mass spectrometer; and an electronic data acquisition system in electronic communication with the mass spectrometer, wherein the electronic data acquisition system processes a plurality of signals provided by the mass spectrometer.

17. The analytical system of claim 16, wherein the ultrasonic nebulizer chip further comprises a continuous-mode driver.

18. The analytical system of claim 16, wherein the ultrasonic nebulizer chip is operatively coupled with an atmospheric pressure chemical ionization device.

19. The analytical system of claim 16, wherein the at least one analog-to-digital converter produces the digitized data from the plurality of signals in a time interval of about 5 seconds.

20. The analytical system of claim 16, wherein the plurality of signals comprises a mass spectrum of the analyte.

* * * * *